US010565239B2

(12) United States Patent
Hancock et al.

(10) Patent No.: US 10,565,239 B2
(45) Date of Patent: Feb. 18, 2020

(54) MICRO-LOCATION IDENTIFIER AND INFORMATION REGISTRIES AND SYSTEMS AND METHODS FOR REAL-TIME PERMISSION-BASED ACCESS AND RELATED MICRO-PAYMENTS

(71) Applicant: WGRS Licensing Company, LLC, Newport Beach, CA (US)

(72) Inventors: S. Lee Hancock, Newport Beach, CA (US); Stephen L. Hancock, Newport Beach, CA (US); Chris Kerstner, Newport Beach, CA (US); Phil Dhingra, Austen, TX (US)

(73) Assignee: WGRS LICENSING COMPANY, LLC, Newport Beach, CA (US)

( * ) Notice: Subject to any disclaimer, the term of this patent is extended or adjusted under 35 U.S.C. 154(b) by 75 days.

(21) Appl. No.: 15/926,980

(22) Filed: Mar. 20, 2018

(65) Prior Publication Data

US 2018/0314714 A1   Nov. 1, 2018

Related U.S. Application Data

(63) Continuation of application No. 15/620,802, filed on Jun. 12, 2017, now Pat. No. 9,928,252, which is a
(Continued)

(51) Int. Cl.
*G06F 17/00* (2019.01)
*G06F 16/29* (2019.01)
(Continued)

(52) U.S. Cl.
CPC ............ *G06F 16/29* (2019.01); *G01C 21/32* (2013.01); *G01C 21/3605* (2013.01);
(Continued)

(58) Field of Classification Search
CPC .......................... G06F 16/00; G06F 16/9537
See application file for complete search history.

(56) References Cited

U.S. PATENT DOCUMENTS 6,912,545 B1 * 6/2005 Lundy .................... H04L 67/18
7,640,511 B1 * 12/2009 Keel ..................... G06Q 10/10
715/769

(Continued)

OTHER PUBLICATIONS

Doty, "The Case for a Location Metasystem," LocWeb 2009, copyright 2009 ACM, p. 1-3. (Year: 2009).*
(Continued)

*Primary Examiner* — Amelia L Tapp
(74) *Attorney, Agent, or Firm* — William A. English; Vista IP Law Group LLP

(57) ABSTRACT

Systems and methods are provided for registering identifiers for locations, including sub-street address level, micro-locations in a real-time registry and controlling access to such locations and related real-time information. Every time the information is accessed, the system verifies continued ownership of the registered location identifier, and applies rules controlled by the owner to determine if, when, how, why, where, and to what extent such real-time micro-location information can be accessed and further enables and accounts for micro-payments to or from the owners to or from the users who are accessing the locations and information.

22 Claims, 35 Drawing Sheets

IAE Services for Locations

Related U.S. Application Data continuation of application No. 14/098,484, filed on Dec. 5, 2013, now Pat. No. 9,678,986.

(60) Provisional application No. 61/733,846, filed on Dec. 5, 2012, provisional application No. 61/782,970, filed on Mar. 14, 2013.

(51) Int. Cl.

| | | |
|---|---|---|
| *G06F 17/22* | (2006.01) | |
| *H04L 29/06* | (2006.01) | |
| *G06F 16/487* | (2019.01) | |
| *G06F 16/9537* | (2019.01) | |
| *H04W 4/029* | (2018.01) | |
| *G01C 21/32* | (2006.01) | |
| *G01C 21/36* | (2006.01) | |
| *H04L 29/08* | (2006.01) | |
| *H04W 4/024* | (2018.01) | |
| *H04L 29/12* | (2006.01) | |

(52) U.S. Cl.
CPC ........ *G06F 16/487* (2019.01); *G06F 16/9537* (2019.01); *G06F 17/2247* (2013.01); *H04L 63/10* (2013.01); *H04L 67/02* (2013.01); *H04L 67/18* (2013.01); *H04W 4/029* (2018.02); *H04L 61/1511* (2013.01); *H04L 61/1588* (2013.01); *H04W 4/024* (2018.02)

(56) References Cited

U.S. PATENT DOCUMENTS

| | | | |
|---|---|---|---|
| 2003/0004937 A1* | 1/2003 | Salmenkaita | G01C 21/20 |
| 2004/0181559 A1* | 9/2004 | Lee | G06F 16/9537 |
| 2012/0047147 A1* | 2/2012 | Redstone | H04L 67/18 |
| | | | 707/748 |

OTHER PUBLICATIONS

Karimi et al., "SoNavNet: A Framework for Social Navigation Networks," ACM LBSN '09, copyright 2009 ACM, p. 81-87. (Year: 2009).*

Paul, "Google Latitude Service Lets You Track Your Friends: How It Works," PCWorld, Feb. 4, 2009, p. 1-5. (Year: 2009).*

Shebab et al., "ROAuth: Recommendation Based Open Authorization," Symposium on Usable Privacy and Security (SOUPS) 2011, USA, p. 1-12. (Year: 2011).*

Jin et al., "Towards Understanding Residential Privacy by Analyzing Users' Activities in Foursquare," BADGERS '12, Oct. 15, 2012, copyright 2012 ACM, p. 25-32. (Year: 2012).*

* cited by examiner

PNL ID User Dialing sequence

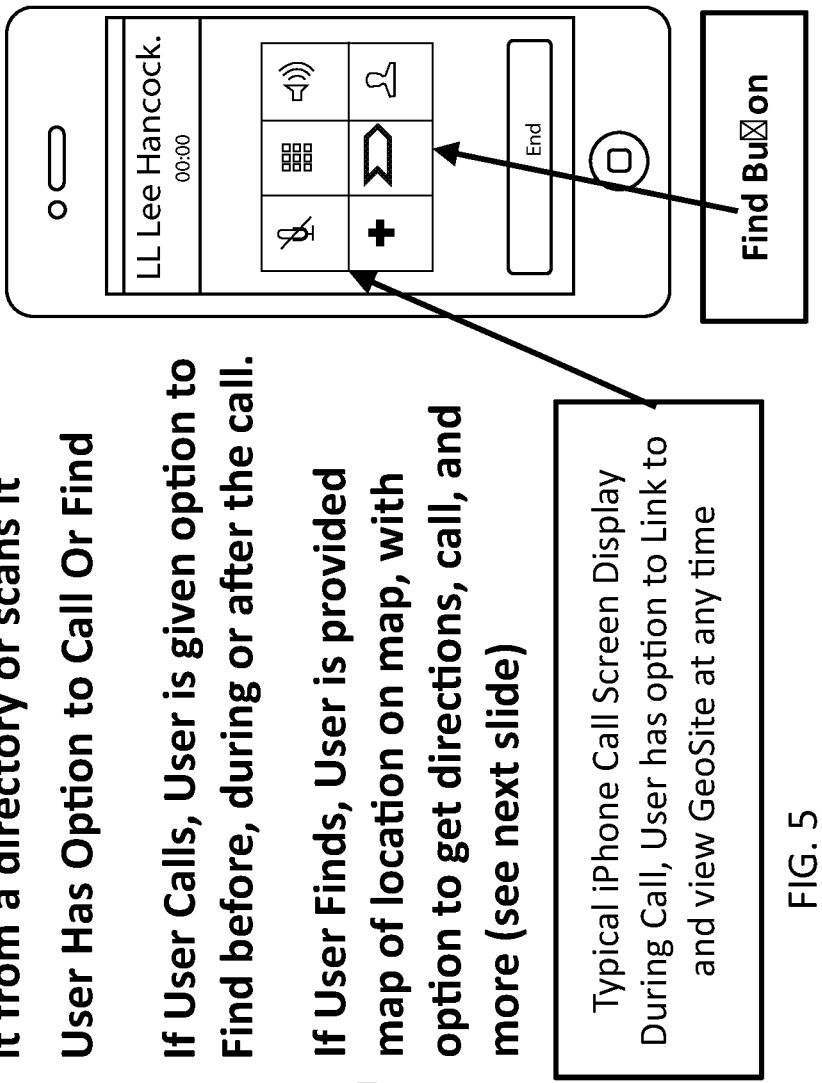

1. User dials phone number, obtains it from a directory or scans it
2. User Has Option to Call Or Find
3. If User Calls, User is given option to Find before, during or after the call.
4. If User Finds, User is provided map of location on map, with option to get directions, call, and more (see next slide)

Typical iPhone Call Screen Display During Call, User has option to Link to and view GeoSite at any time

FIG. 5

Illustrations of IAE Services on Mobile Devices

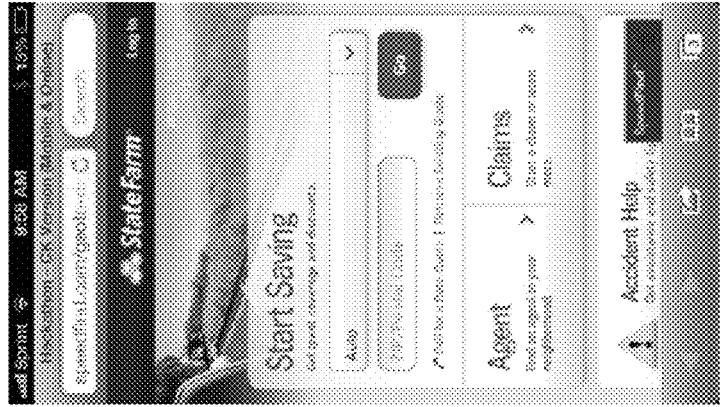

Illustration 3

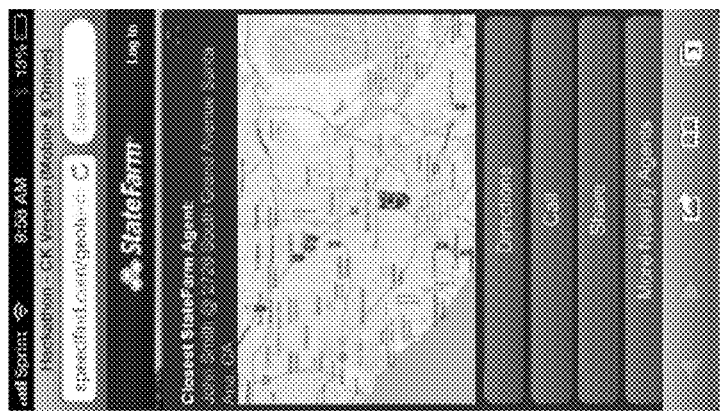

Illustration 2
FIG. 9

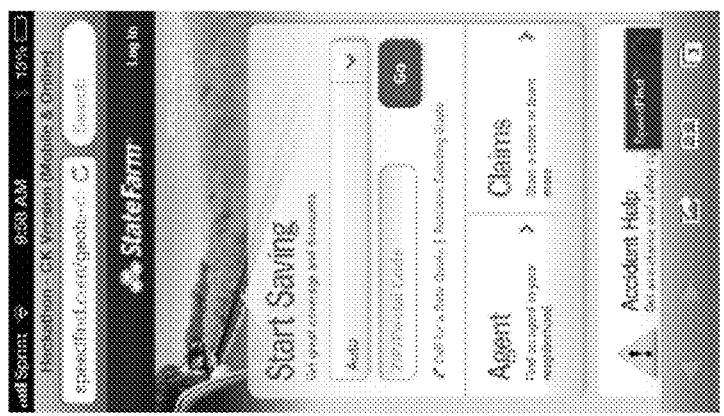

Illustration 1

IAE Services slide up and from the bottom or side and are anchored to the bottom or side of the mobile viewing window. IAE Services are not visible in Illustration 1, but slide up from the bottom in Illustration 2 if the user clicks the tab, and IAE Services are not visible in Illustration 3 but remain instantly available upon request by the user.

IAE Services provided by browser on third party websites using LIDs or other means to determine appropriate IAE Services Example IAE Service showing Live Map of Users locations, closets dealers, and distances to view inventory Example of IAE Services imbedded in Internet Browser to automatically show live, interactive map of locations relative to users location.

Expansion of Location Icon to provide full service navigation and communications tools Examples of Speedfind IAE Services imbedded in browser or operating system layered on top of mobile website.

Example of "Driving Mode" IAE Services for Mobile

Example of IAE Services with Live navigation map layered over video ad

Uses of SODs with GeoLinks

SODs can be used to create several thousand permutations of the same readable and scannable GeoLink that can be used for tracking the source of the link (sort of an extension of call tracking or a tracking pixel) or to display different or custom content based on the SOD.

It can also be used to identify the City, State, Country or other component of a GeoLink, so that the actual scannable GeoLink could only include the actual Name (e.g. Mary) or perhaps just the name and city.

— This allows only the true Name to be shown and displayed but the scan will resolve to numerous different GeoSites based on the SOD.

Note: Because of the differences in the graphics, these two GeoLink displays for "Mary" can be scanned and resolved to different GeoLinks, one for Mary in New York city and one Mary in Florida

FIG. 28

Examples of Mobile Access Triggers

- Voice or other audible commands
- Movement (standard or unique swipes, shakes)
- Single or unique combination of Keystrokes, clicks, etc.
- Unique icons or images

Examples of Cross Service Systems

- User preferences
- Persistent or optional Search customization, filtering and preferences
- User and usage history
- User owned and managed LIDs
- User accounts and account information
- Payment preferences, tools and services
  - from users or others to IAE Services and locations
  - from IAE Services and locations to users or others
- Rewards and loyalty programs and incentives
- Individual, group and other sharing preferences and systems
- Calendaring and logging
- Privacy and other settings
- Automatically sending LID or information to user's phone or group via sms, emails, etc.

FIG. 31

Example Code Integration for Cross Services Systems and the use of LIDs

Sample Code to be included on Customized Location Services Website:

```
script src="http://speedfind.com/js/geoto-tab.js" type="text/javascript"></script>
<script type="text/javascript">geoto_tab_parameters("http://geo.to/hi", 1, 5);</script>
```

*Note the use of the underlined ID for Holiday Inn (HI) in the above code. This designates both the LID for this particular Customized Location Service and automatically references the type of Cross Services Systems to be used to determine the location of the user/device (adjusted for the preferences or customization of the user by the Cross Services Systems) and to provide and display x number of locations and related information displayed and ranked by proximity to the location.*

*Note that the LID in this case could programmatically capture the domain name of the website (e.g. http://HolidayInn.com or http://geo.to/HolidayInn.com/hi.iwaca) or other non-locational ID visible on or included in the code of the underlying services to automatically determine the location to be used and/or the nature of the content and services provided by the Cross Services Systems. Note also that the designated or automatically captured LID could also be a phone number, Twitter Name, email or other identifier, preferably included in the LID Registry.*

FIG. 32

Examples of utilizing LIDs and LID Registry for Public Safety Registry and Related Emergency 911 Services

Utilizing LIDs for Public Safety Registry

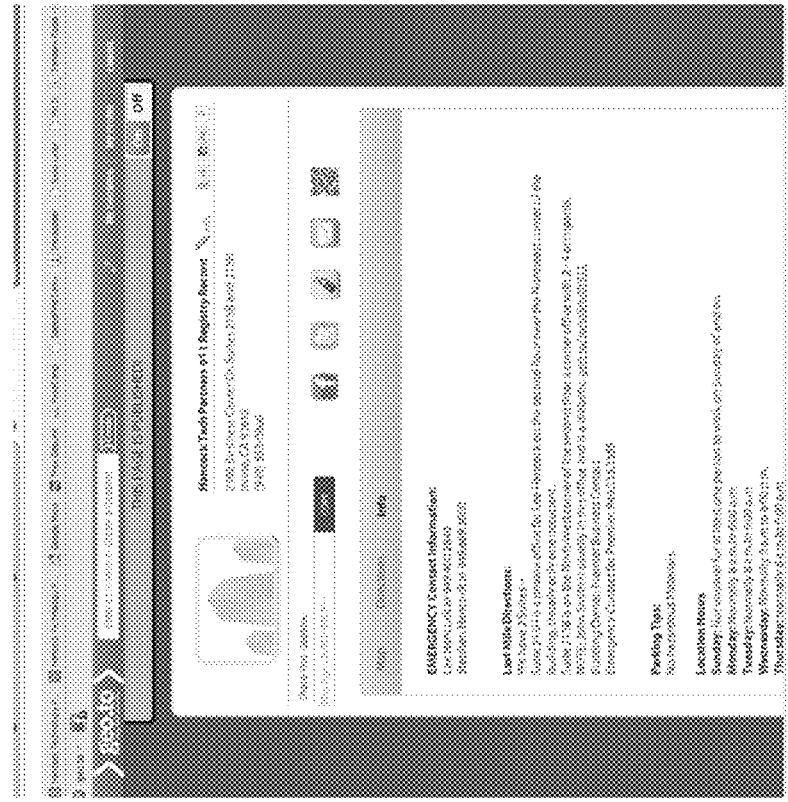

1) LIDs and related Services can be used for a Owner controlled public safety registry to provide information to PSAPs and Responders by creating LIDs for locations, devices and people and using the LID Registry to acquire, update, manage, store and disseminate public safety information to PSAPs and emergency responders via links, SMS, APIs, etc.
2) Owner controls the publication of the page and can make it public and available only upon the existence of a public safety/911 event and/or upon real-time authorization by the Owner or other authorized person. Availability can be turn off automatically, after passage of time, or by the Owner or other authorized person, thereby enhancing privacy and control by the Owner.
3) Businesses and other locations can be give LIDs for one or more individual employees that contain access to sensitive or private information such that the business does not gain access to the information or perhaps only in the event of an authorized emergency, and employee can control such information and access independently of the employer.
4) In this example the fact that John Smith is a diabetic is disclosed, but only the LID and link to John Smith's 911 Public Safety Registry Record is provided, and the availability of that information can be controlled by John Smith.

FIG. 33

Example Information and Services Online Access Interface for Public Safety Registry

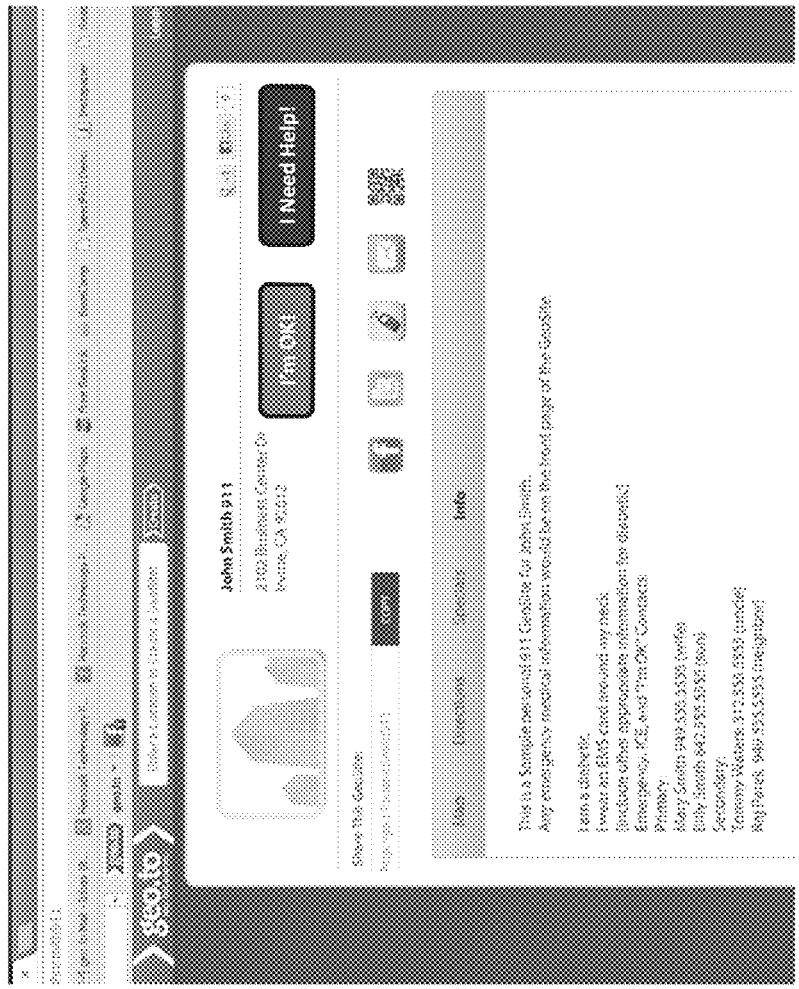

1) Example of individual Public Safety Registry information for John Smith.
2) Individual Public Safety Registry Display and functions would include a one touch – I'm OK button that would send notification to pre-set persons that the person represented by the LID was ok and/or to automatically establish communication channels with the persons designated by the Owner for any further communications. Such Button would be available to both the Owner, emergency responders and others accessing the service.
3) Both "I'm OK" and "I Need Help" buttons could trigger communications to multiple persons previously designated by the Owner.

FIG. 34

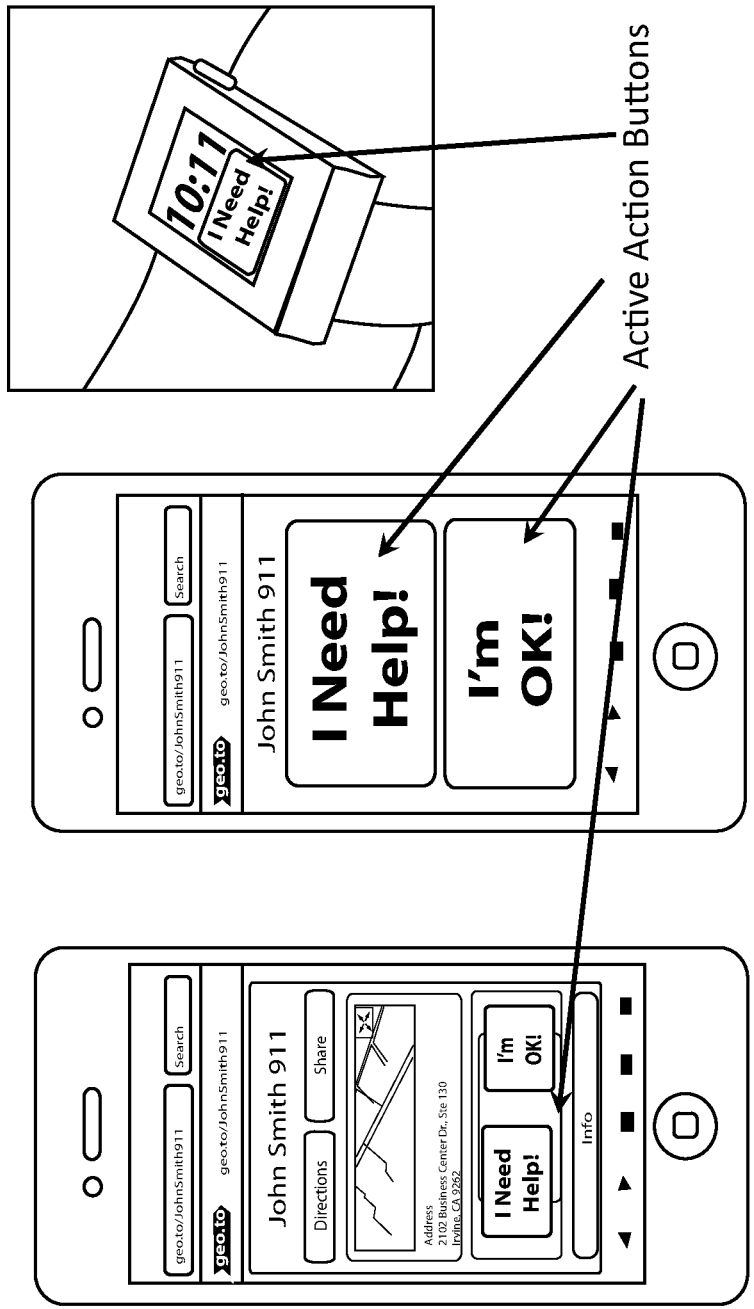

MICRO-LOCATION IDENTIFIER AND INFORMATION REGISTRIES AND SYSTEMS AND METHODS FOR REAL-TIME PERMISSION-BASED ACCESS AND RELATED MICRO-PAYMENTS

RELATED APPLICATION DATA

The present application is a continuation of application Ser. No. 15/620,802, filed Jun. 12, 2017, issuing as U.S. Pat. No. 9,928,252, which is a continuation of application Ser. No. 14/098,484, filed on Dec. 5, 2013, now U.S. Pat. No. 9,678,986, which claims benefit of provisional application Ser. Nos. 61/733,846, filed Dec. 5, 2012, and 61/782,970, filed Mar. 14, 2013, the entire disclosures of which are expressly incorporated by reference herein.

FIELD OF THE INVENTION

The present invention relates to systems and methods related to identifying, registering, acquiring, managing, referencing, managing, controlling, disseminating, accessing, and using location names as addresses and identifiers, and real-time information and services related to such addresses and identifiers. The present invention also relates to systems and methods for utilizing such addresses and locational identifiers for providing detailed, customized, and/or personalized real-time location information and services, including maps, directions, events, contact and/or other information and/or enhanced and/or accelerated communications, tracking, data and other services.

SUMMARY

The present application is directed to systems and methods related to identifying, acquiring, managing, referencing, managing, controlling, disseminating, accessing, and using location names as addresses and identifiers and real-time information and services related to such addresses and identifiers. Described herein are various systems and methods to enable persons (collectively "Owners") who own or control various types of discrete non-locational identifiers ("Non-Locational Identifiers") such as phone numbers, domain names, Other Proprietary Names (as defined below), and certain Biometric Attributes (as defined below) to register, associate, and curate such Non-Locational Identifiers directly to one or more locations and related information in order that such names, identifiers and attributes may be utilized as a new form of physical address and location identifier by 1) individuals or devices accessing and using such services or information (collectively "End Users") and 2) other services, developers, and other providers of such services or information to End Users (collectively, and together with End Users, "Users") to identify and obtain access to locations and related information and services provided, curated, or otherwise controlled by such Owners. The systems and methods described herein enable the use of Non-Locational Identifiers as Locational Identifiers (as defined below) by adding to the capabilities of Non-Locational Identifiers by enabling them to be used as physical and geographic addresses and providing new ways to meet the many needs for more direct, precise and interoperable location referencing and information and enabling and/or enhancing numerous new types of locational products and services.

In addition, the systems and methods described herein relate to the creation, operation, and/or use of one or more interoperable Location Identifier Registries (as defined below) for associating and curating the following types of Non-Locational Identifiers to one or more fixed and variable locations:

1) Phone Numbers
2) Domain Names
3) Biometric Attributes (as defined below)
4) Other Proprietary Names (as defined below)

Further, this application describes new interoperable systems and methods for combining and assimilating these Location Identifier Registries (as defined below) into one universal Location Identifier Registry (as defined below) and key components of the Location Identifier Registry, including Registry and Verification Modules (as described below), Access and Control Modules (as described below), Location Control Modules (as described below), Vertical Location Registry Services and Search (as described below).

The systems and methods described herein may also provide interoperable services such as an Open Clearinghouse, Pay Per Use and Performance, Revenue Sharing, Accounting, Enhanced Scanning and Optical Character Recognition, and Phone Number and Other Tracking Benefits, as described below and in the applications incorporated by reference herein.

The present application is also directed to systems and methods to instantly provide, either automatically or using a user interface (e.g., triggered with only one click, touch, unique keystroke sequence, movement (device, swipe, or other hand gesture), voice or other audible command, or triggered by the location or proximity of the user or device to a known location or other trigger (e.g., a RFID chip or scan of a QR or other code)), detailed, customized, and personalized (by device, End Users, location or other Context (as defined below)), real-time location information and services, including maps, directions, events, contact, and/or other information and enhanced and accelerated communications, tracking, data and other services as IAE Services (as defined below) that provide Cross-Service Systems (as defined below) in connection with Customized Location Services (as defined below).

The IAE Services typically provide the End User with persistent, easily recognizable, and familiar access points across numerous (potentially all) devices and services including operating systems, browsers, web sites, applications, services and content (collectively, "Devices and Services"), with such access points and IAE Services typically layered on top of, but Contextually tied to, the underlying information and services typically provided by traditional Devices and Services via websites and web-based information access by Devices and Services. Such IAE Services may be imbedded in the underlying device, application, website, the browser and/or other applications providing access to the website, internet service and information, or the operating systems or other hardware or software access points in the devices providing access to such information. For example, FIG. 8 demonstrates and contains an example of IAE Services imbedded in a browser or websites. Referring to FIG. 8, which shows an alternative form of instant communication tools that can be imbedded in the browser, web pages, or other interfaces, if the users clicks on the Phone Icon at A, the user is given options via the dialogue box B to send the information via a link to his own phone automatically, or to input and send the link to any other phone. This instant communication tool could also include a tweet, email, or other communication methodology, and it could be automatically or manually sent to one or more recipients based on various preset parameters (Location of the user or device, time of day, location of the recipient, etc.).

The systems and methods related to IAE Services may optionally be facilitated by directly or indirectly utilizing Locational Identifiers ("LIDs"), one or more LID Registries, and the various Registry and Verification, Access and Control, and/or Location Control Modules and other components and services related thereto. The terms "Context," "Contextual," and "Contextually" are used herein to mean virtually any information related to, associated with, or potentially relevant to the End User, the information being viewed or accessed, the use of any service, both before, during, or after any particular use, including date, day, time, weather, past, present or projected location, trip, purpose, either obtained, known, learned or provided by the End User or any other source, and/or predicted by any service using any of such information.

Also described herein are various systems and methods to enable Owners to associate Non-Locational Identifiers with LIDs and to use such identifiers to enable non-locational services (e.g., phones, internet browsers, social media applications, and the like) to instantly and easily add extremely accurate, curated and controlled locational information and services to be utilized by Users to instantly and more accurately acquire, identify, present, disseminate, and/or more easily, quickly, and accurately obtain access to locations (typically but not necessarily, one or more locations that are automatically determined to be in close proximity and/or otherwise Contextually relevant to the End User) and related real-time information and services. Further, various systems and methods described herein enable providers and Users of such information and services to more easily and accurately customize, personalize, enhance, share, record, and utilize such real-time information and services by utilizing interoperable cross-service uber-services, systems and registries that enable easier, faster and better services (typically but not necessarily, related to one or more locations) for End Users automatically without the necessity of using cumbersome traditional street addresses or latitude longitude coordinates, establishing accounts, preferences and other direct connections with each and every such individual service. Collectively, such individual Devices and Services and related information are referred to herein as "Customized Location Services," the interoperable, cross platform, device and services uber-services and information and systems described herein are referred to as "Cross-Service Systems," and the Customized Location Services that provide instant access and/or are enhanced by the Cross-Service Systems are referred to herein collectively as Instant Access Enhanced Services and Information, or "IAE Services."

Further, this application describes new interoperable systems and methods for enabling IAE Services to instantly provide, and for End Users to instantly access such IAE Services and Information across any mobile or online website or other enabled Device or Service with persistently and instantly available services that are easily recognizable, fully integrated with, but otherwise without impacting (or only nominally impacting) the other features and services of any Device or Service. The Cross-Service Systems are typically separate services running synchronously or asynchronously in the background as a separate layer and typically hosted by and interfacing with the Cross-Service Systems. Thus, the instant access methodology or interoperable display layer acts as a cross-platform, universally recognized and understood service, accessible automatically or through a single action or combination of voice, audible, touch, movement (e.g., swipe or shake) input or other command or designation, and operated dependently and integrated with, or with any such integration independently of, the underlying Customized Location Services and/or Device or Service. For clarification, the term IAE Services may also include one or more of an Open Clearinghouse, Pay Per Use and Performance, Revenue Sharing, Accounting, Enhanced Scanning and Optical Character Recognition, and Phone Number and Other Tracking Benefits.

The overarching objective of the IAE Services is to enable individuals to instantaneously access and obtain specific yet customized information and services, typically related to physical geographic locations or events at or near the location or projected location of an End User or otherwise Contextually relevant to the End User, including an automatically customized and Context enhanced map, directions, or information related to one or more locations, and to more easily, quickly, and efficiently communicate directly with such locations and events and/or about such locations or events with others with or without integration with the underlying Customized Location Services and/or Device or Services. Another option of the IAE Services is to allow the Cross-Service Systems the ability to acquire information (such as location, weather, etc.) separate from the Customized Location Services in the background, or through other systems that may or may not be available or easily available to the Customized Location Services independently of the Cross Service Systems, and process such information (either remotely over a network or internally using systems that may or may not be available to the Customized Location Services) in order to provide faster and better access to more timely and accurate information and services to the End Users who access the IAE Services, thereby 1) reducing or eliminating any negative impact and effort required to engineer, design, build and operate the enhanced Customized Location Services by the owner and operator of such services, 2) enabling services not otherwise possible without the Cross Services Systems and 3) increasing the speed, efficacy and quality of the combined IAE Services for the End User.

In accordance with an exemplary embodiment, a method is provided for registering, curating and providing access to location information with a locational identifier (LID) registry. The method may include receiving a request, from an electronic device of an owner via a network, to register a non-locational identifier owned by the owner and create a locational identifier for a physical location, the request including the non-locational identifier; verifying that the owner owns the non-locational identifier; converting the non-locational identifier to a locational address within the LID registry; communicating with the LID registry to verify that the locational address is unique and available within the LID registry; and registering the locational address to the owner and associating the non-locational identifier with the locational address within the LID registry.

The method may also include enabling the owner to control access by end users to location information associated the locational address included in the LID registry. For example, the owner may select from a plurality of options for limiting access by end users to the location information, such as requiring an end user to enter a password to access the location information; limiting end users access to the location information based at least in part on locational proximity of the end users to the physical location; limiting end users access to the location information based at least in part on date and time; and/or limiting end users access to the location information based at least in part on connectivity of the end users to a third party identified by the owner.

Optionally, the method may also include receiving a user request, from a user electronic device via the network, the request including the non-locational identifier; accessing the LID registry to confirm that the non-locational identifier is associated with a locational address within the LID Registry; verifying that the owner of the locational address within the registry has authorized the user electronic device to access information associated with the locational address; and sending a response to the user electronic device via the network, the response including authorized information regarding the physical location from the LID registry for presentation on a display of the user electronic device.

In accordance with another embodiment, a system is provided for registering, curating and providing access to location information that includes a database including a locational identifier (LID registry; and a server communicating with the database via a network. In an exemplary embodiment, the server may be configured to receive a request, from an electronic device of an owner via a network, to register a non-locational identifier owned by the owner and create a locational identifier for a physical location, the request including the non-locational identifier; verify that the owner owns the non-locational identifier; convert the non-locational identifier to a locational address within the LID registry; communicate with the LID registry to verify that the locational address is unique and available within the LID registry; and register the locational address to the owner and associating the non-locational identifier with the locational address within the LID registry.

In accordance with still another embodiment, a method is provided for providing information regarding physical locations that includes receiving a request, from a user electronic device via a network, the request including a non-locational identifier; accessing a locational identifier (LID) registry to confirm that a locational address and physical location are associated within the registry with the non-locational identifier and obtain information regarding the physical location; and sending a response to the user electronic device via the network, the response including the information regarding the physical location for presentation on a display of the remote electronic device.

In accordance with yet another embodiment, a method is provide for accessing information regarding a physical location that includes inputting, using a user interface of an electronic device, a non-locational identifier; sending a request, via a communication interface of the electronic device, a request including the non-locational identifier to a remote location via a network; receiving a response, via the communication interface, including information regarding a physical location associated with the non-locational identifier; and presenting on a display of the electronic device the information regarding the physical location.

In accordance with still another embodiment, a method is provided for accessing information regarding a physical location that includes inputting, using a user interface of an electronic device, a phone number; presenting on a display of the electronic device a plurality of icons representing optional actions including placing a phone call and accessing additional information regarding a physical location associated with the telephone number; selecting, using the user interface, an icon to access additional information; sending an information request, via a communication interface of the electronic device, to a remote server communicating with a LID registry, the information request including the phone number; receiving an information response, via the communication interface from the remote server, including location information regarding the physical location; and presenting, on the display of the electronic device, the location information regarding the physical location.

In accordance with yet another embodiment, a method is provided for accessing information regarding a physical location that includes presenting, on a display of an electronic device, webpage content assigned to a URL, and an information icon to access location information and services previously associated with the URL; selecting, using a user interface of the electronic device, the information icon; accessing location information regarding a physical location associated with the URL based at least in part on a location of the electronic device; and presenting, on the display of the electronic device, the location information regarding the physical location over the webpage content.

Other aspects and features of the present invention will become apparent from consideration of the following description taken in conjunction with the accompanying drawings.

BRIEF DESCRIPTION OF THE DRAWINGS

The invention is best understood from the following detailed description when read in conjunction with the accompanying drawings. It will be appreciated that the exemplary apparatus shown in the drawings are not necessarily drawn to scale, with emphasis instead being placed on illustrating the various aspects and features of the illustrated embodiments.

FIG. 5 shows an exemplary embodiment of an electronic device and associated method for accessing information regarding a physical location based on a PNL ID.

FIG. 9 shows an exemplary images of mobile web sites displayed in a mobile browser of an electronic device including IAE Services access icons and an exemplary layer of IAE Services and information.

FIG. 13 shows an image of IAE Services with Real-Time Visual Display of Distance, Time, and Cost to Locations. All are based on real time traffic, weather, day and time. Cost is personalized based on user provided or learned information.

FIGS. 28 and 29 show exemplary images of various types of subliminal optical differentiators that may be included in the systems and methods herein.

FIG. 31 shows exemplary mobile access triggers and commands and examples of cross service systems related to locational identifiers and IAE Services included in the systems and methods herein.

FIG. 32 shows exemplary computer programming code utilizing locational identifiers to access locational addresses and related information included in the LID registry.

FIG. 33 shows an exemplary image of an online website page displaying the use of locational identifiers and related information for 911 and other emergency services for a locational address associated with a business included in a 911 emergency services related LID Registry that may be included in the systems and methods herein.

FIG. 34 shows an exemplary image of an online website page displaying the use of locational identifiers and related information for 911 and other emergency services for a locational address associated with an individual included in a 911 emergency services related LID Registry that may be included in the systems and methods herein.

FIG. 35 shows exemplary images of pages of a mobile phone website or mobile phone application and a watch using locational identifiers and related information for 911 and other emergency services for a locational address associated with an individual included in a 911 emergency services related LID Registry that may be included in the systems and methods herein.

DETAILED DESCRIPTION OF THE EXEMPLARY EMBODIMENTS

Figure 1:
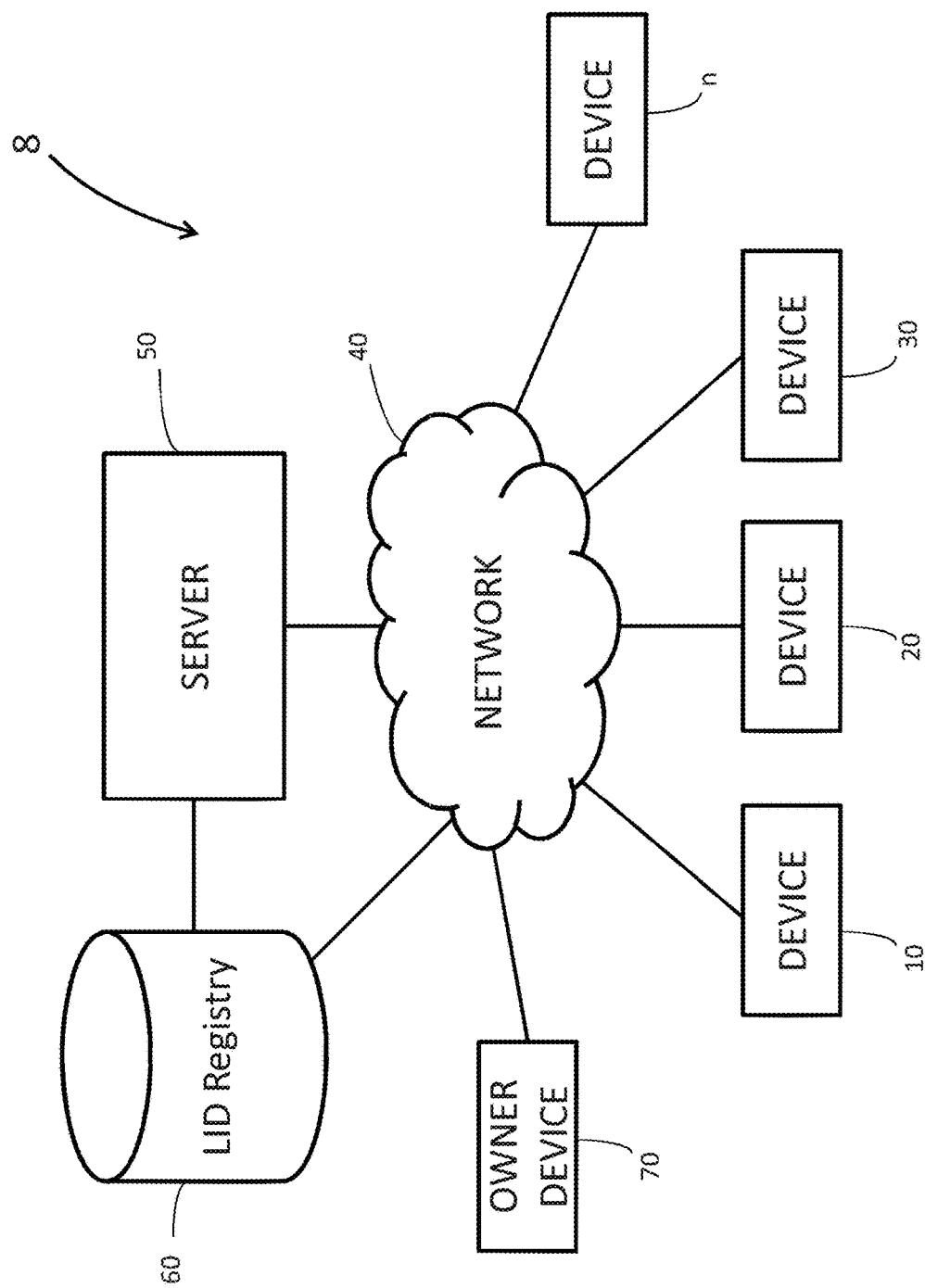
FIG. 1 is a schematic drawing showing a network architecture providing an exemplary embodiment of a system for performing the methods described herein.

Turning to the drawings, FIG. 1 shows an exemplary embodiment of a system 8 for performing the various methods and/or functions described herein. As shown, the system 8 includes various devices connected to a network 40, such as user devices 10, 20, 30, $n$, a server 50, and a LID registry 60. In addition or alternatively, the system 8 may also include one or more owner electronic devices 70 (one shown for simplicity) connected to the network 40 for communicating with the server manager 50 and/or LID registry 60 via the network.

For example, client, servers, and other systems may be created for establishing, curating, controlling, searching, and/or otherwise using LIDs by Owners and Users, according to the systems and methods described herein, including various devices connected to a network, such as various mobile and other user computers, phones, vehicle navigations systems, and other devices connected to a private or public network, including a wide area network ("WAN"), a local area network ("LAN"), an intranet, a wireless network, a short messaging service ("SMS"), or a telephony network. For example, any such network may incorporate several different types of networks including a WAN, a LAN, and/or a wireless network. One such network including multiple different types of networks is the Internet.

Any of the electronic devices, e.g., the user devices 10-$n$ (e.g., as also shown in FIGS. 5, 6, 10, 12, and other drawings herein), owner devices 70, and the like may be a desktop computer, a laptop computer, a mobile or cellular telephone, a personal digital assistant (e.g., a Palm Pilot device, Blackberry device, and the like), glasses or other wearable computing devices, interactive television, a vehicle or portable navigation system, a kiosk, a lobby or elevator monitor, or other electronic device, capable of communicating via any such network. Generally, the electronic devices 10-$n$ or 70 may include one or more processors, memory and/or storage devices, communication interfaces, and/or User interfaces, e.g., a display, keyboard, mouse, and other types of interactive interfaces (voice, motion, etc.), and the devices 10-$n$ or 70 may interact with the server 50 and/or LID Registry 60, e.g., by inputting LIDs or other requests that may result in the inclusion of LIDs in the information or files provided or communicated or other information related to items of interest associated with the LIDs as described elsewhere herein.

The LID Registry and database, clearinghouse, access and control, accounting and other modules may include one or more hardware-based components and/or software-based modules for performing the various functions related to the methods performed, as described elsewhere herein. Multiple interoperable or distinct LID Registries and modules may be used for various specific purposes or specific or certain types of LIDs.

Figure 2:
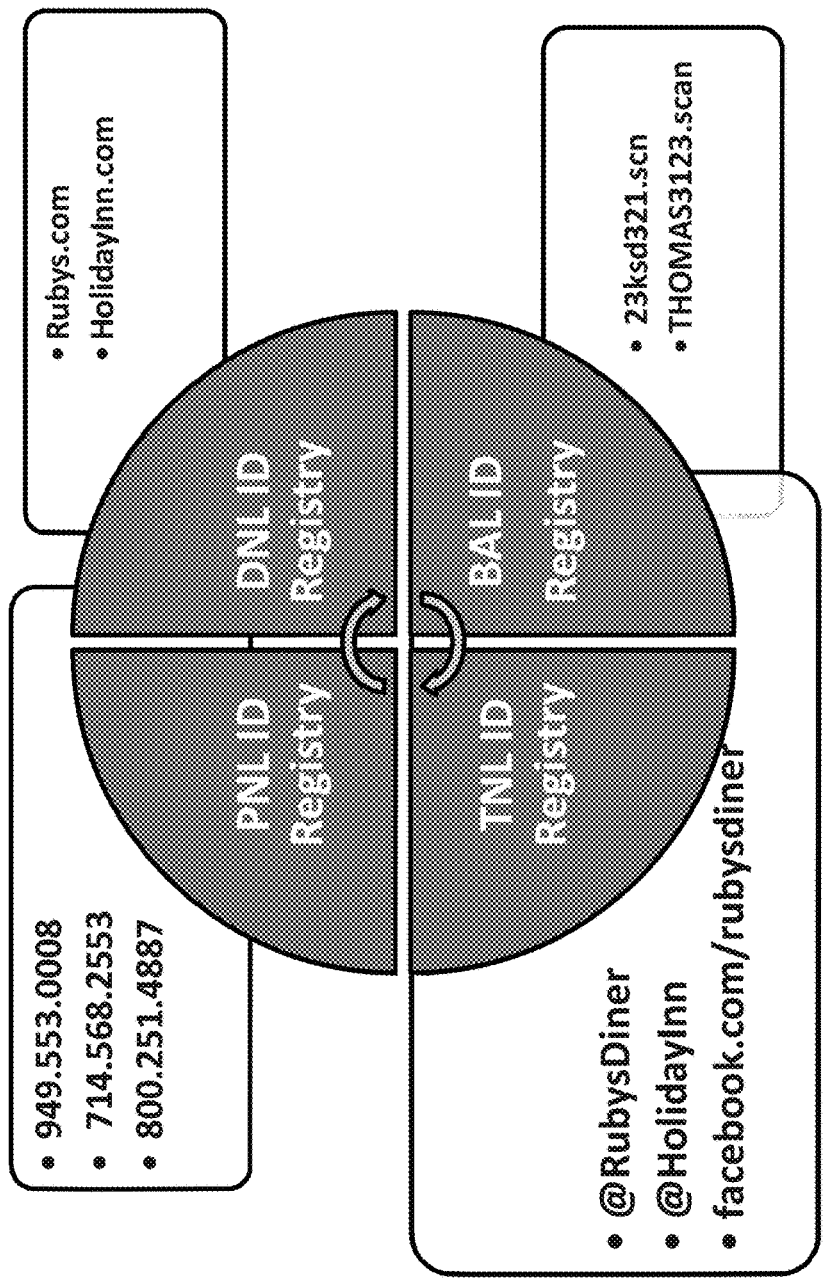
FIG. 2 shows exemplary embodiments of Location Identifiers that may be used in the systems and methods herein.

Turning to FIG. 2, exemplary types of Non-Locational Identifiers are shown that, with the systems and methods described herein, may become LIDs through the utilization of the LID Registries, some of which are described in detail below.

Phone Number to Location Registry and Service

Figure 3:
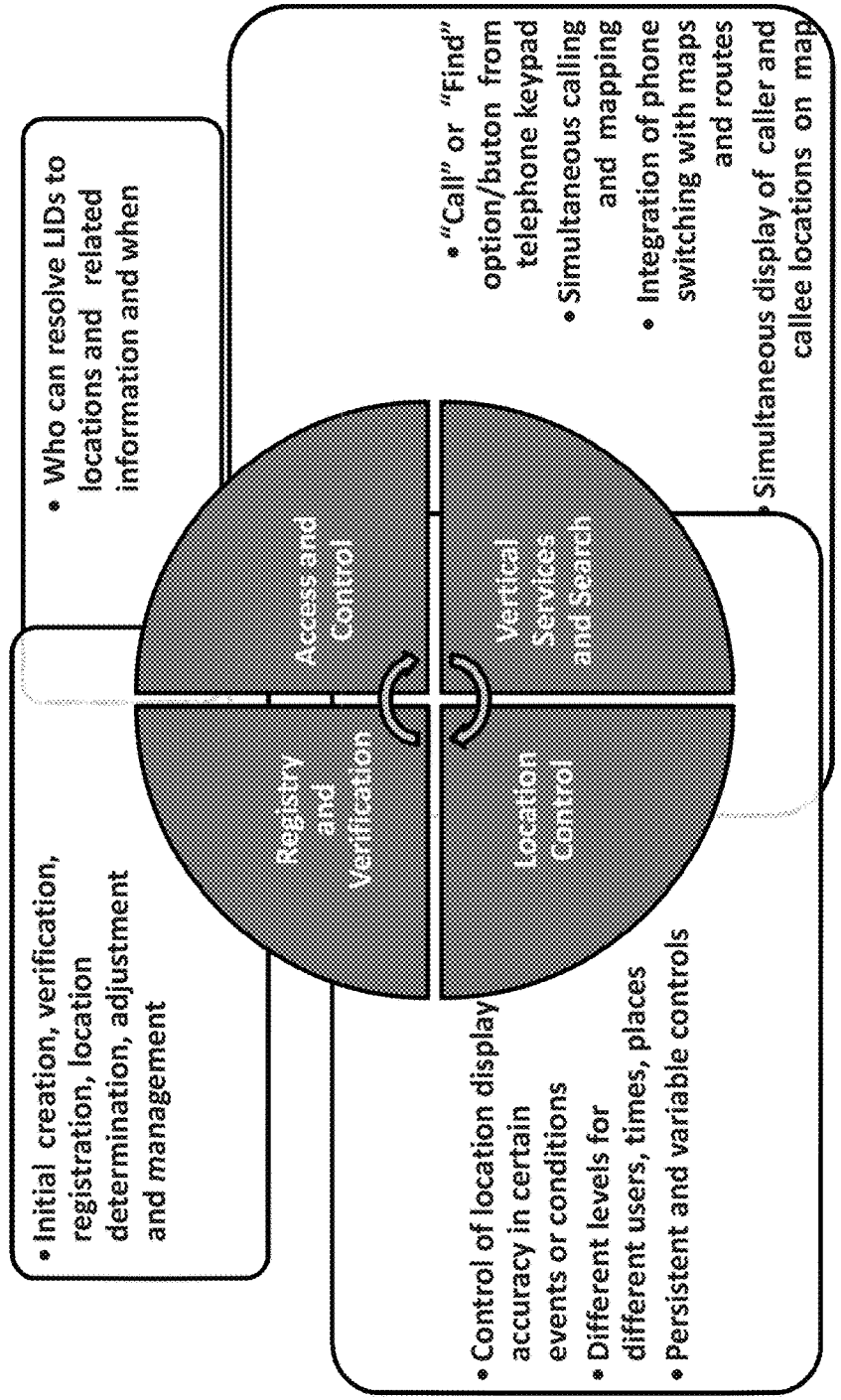
FIG. 3 shows exemplary features and modules that may be included in the systems and methods herein.
Figure 4:
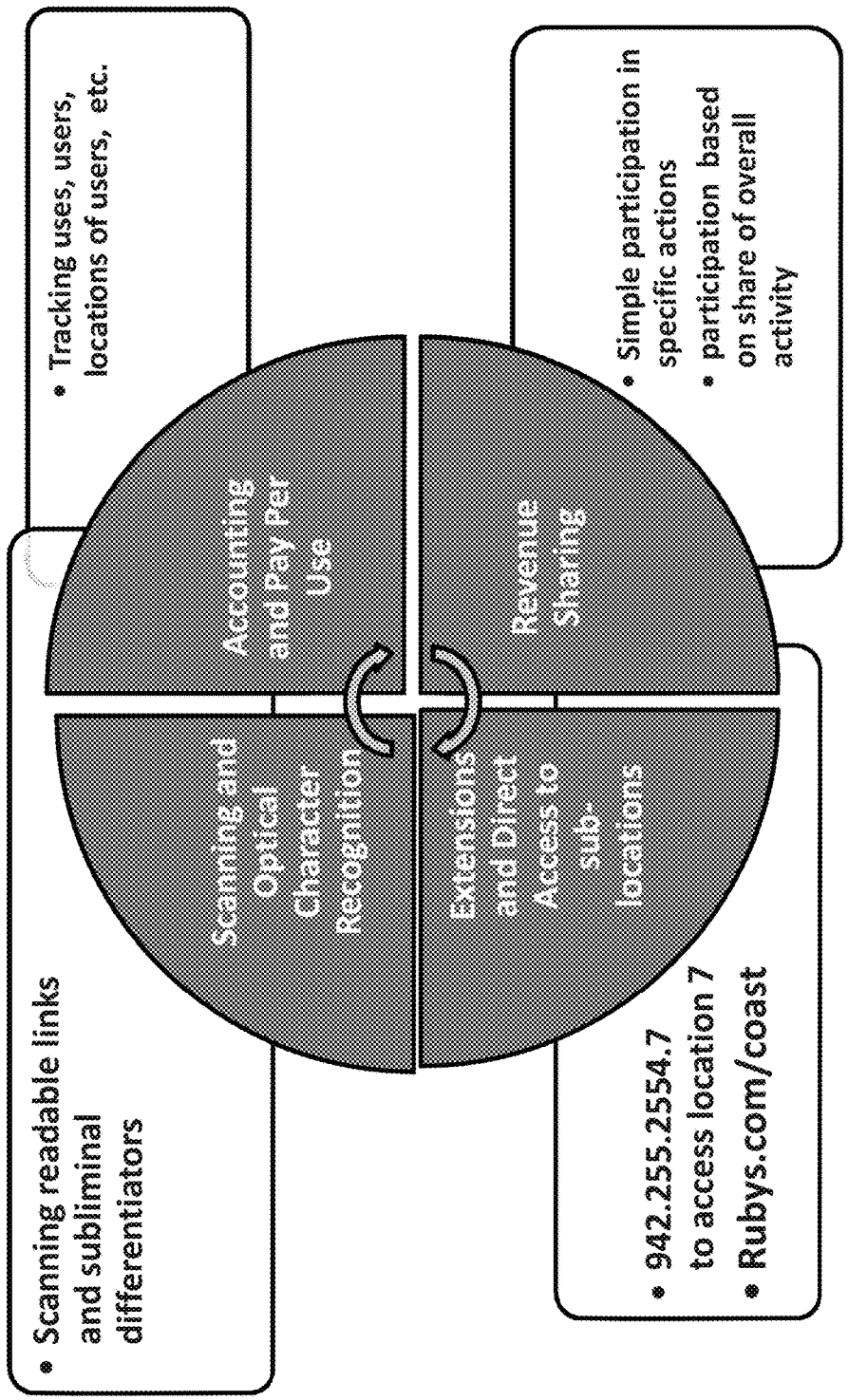
FIG. 4 shows exemplary additional services that may be included in the systems and methods herein.
Figure 6:
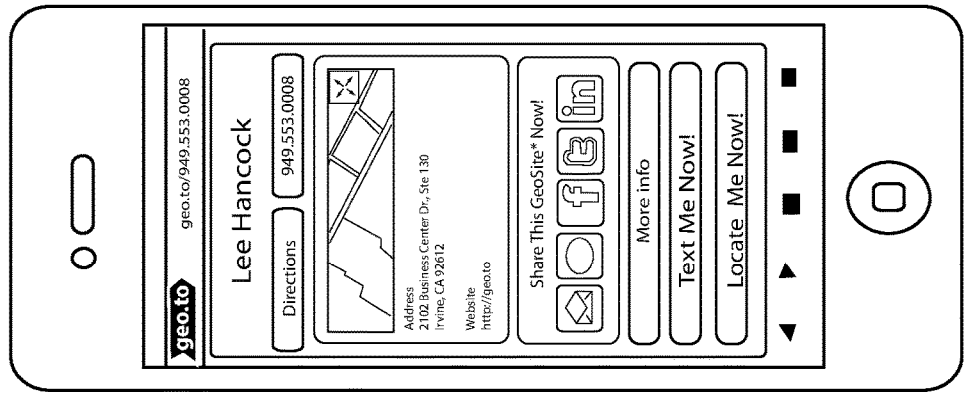
FIG. 6 shows an exemplary embodiment of an electronic device and exemplary information that may be available using the electronic device in conjunction with the systems and methods herein.
Figure 7:
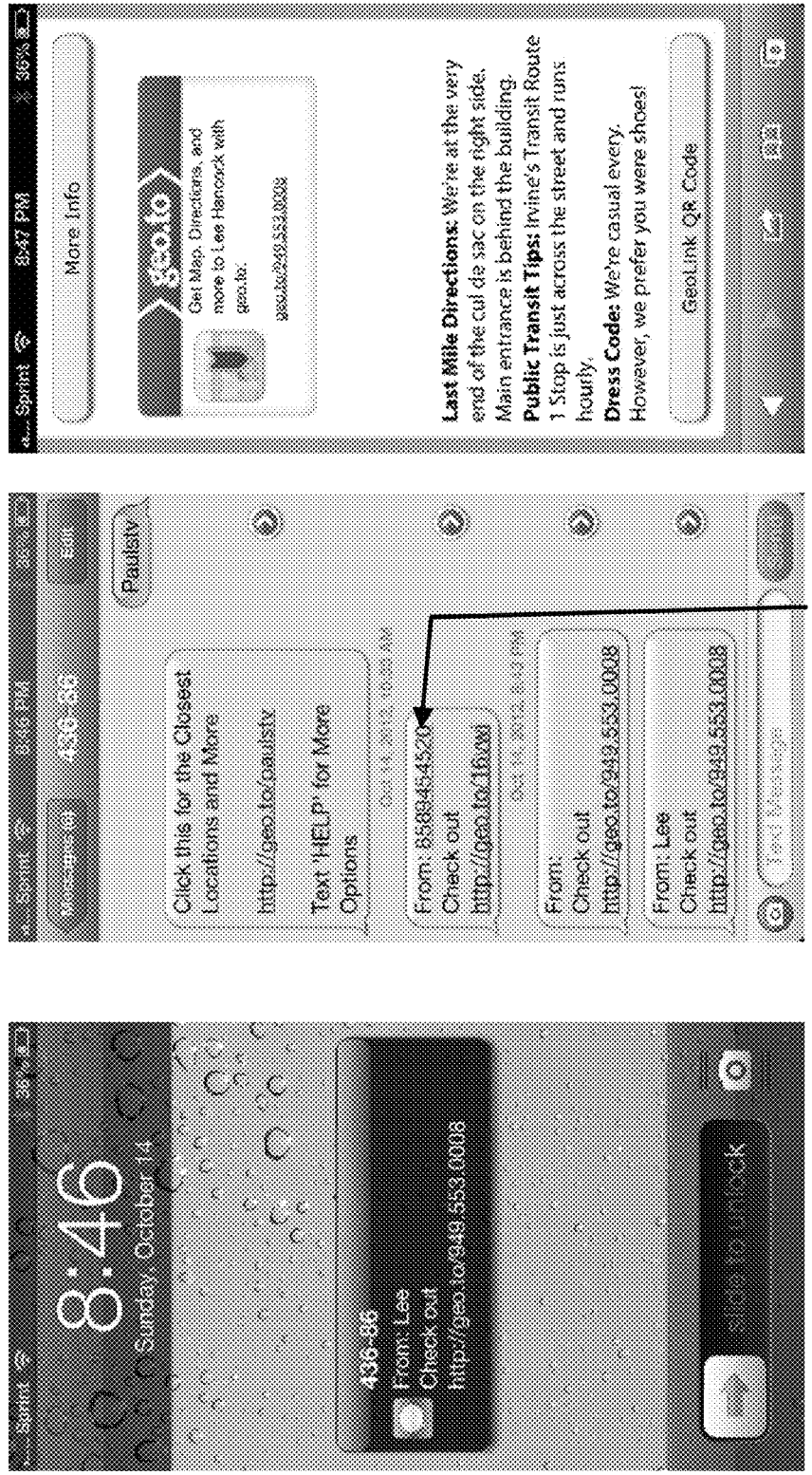
FIG. 7 shows an exemplary embodiment of a display of an electronic device, showing images of a method for using a PNL ID imbedded in or related to SMS text message and interfaces.
Figure 8:
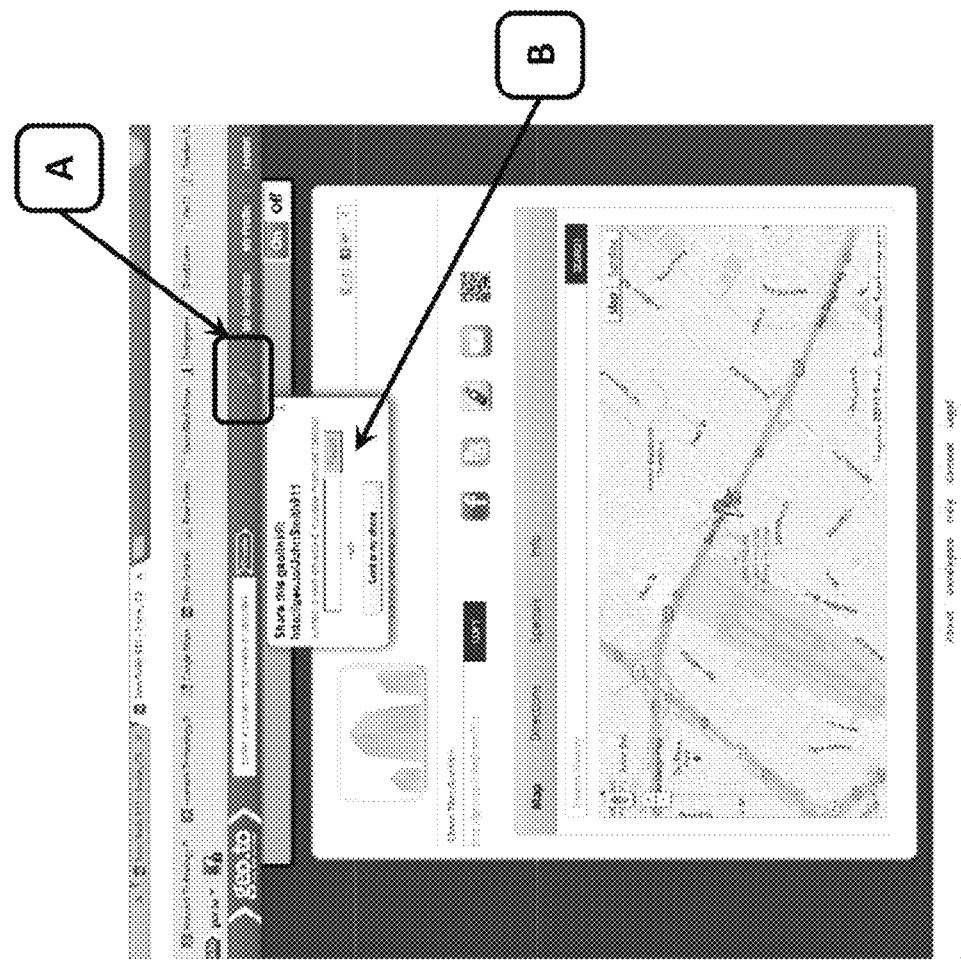
FIG. 8 shows an exemplary embodiment of integration of IAE Services in an Internet browser and the ability to provide personalized services to an End User such as one-click forwarding of the location to the User's mobile phone via SMS.

The systems and methods for creating a registry of locations related to and identified with mobile, landline, toll and toll-free, local and long distance telephone and other similar phone numbers (the "Phone Number Location Registry" or "PNL Registry") include systems and methods used for verifying and registering such phone number within a country that is consistent with the specific country's existing phone number numbering plan, identifying and associating one or more locations to such phone number in an international worldwide registry, repository and clearinghouse directory to establish a globally unique PNL Registry identifier ("PNL ID") for a location, using all or a portion of the PNL ID to acquire, reference, access, use, navigate to, publish, track and/or provide real-time information and services related to the one or more specific, static locations, the location of the device, and/or Owner associated with a specific phone number and PNL ID, ensuring and curating that the PNL ID is owned and controlled by the owner of the underlying phone number, providing such Owner control of such PNL ID, and providing various voice, data, and location-based services to parties using that phone number as a PNL ID to receive, initiate or participate in phone calls, obtain or provide location information and/or acquire or use such data or other services, such as those shown in FIG. 3.

Domain Name to Location Registry and Service

The systems and methods for creating a registry of locations related to and identified with Internet and other domain names (the "Domain Name Location Registry" or "DNL Registry") include systems and methods for verifying and registering a typical internet domain name as an LID and assigning that domain name to one or more physical locations in an international worldwide registry, repository and clearinghouse directory to establish a globally unique DNL Registry identifier ("DNL ID") for a location, and using all or a portion of the DNL ID to acquire, reference, access, use, publish, and/or provide real-time information and services related to the one or more specific, static locations and/or the location of the Owner associated with that domain name and DNL ID, and ensuring and curating that the PNL ID is owned and controlled by the owner of the underlying domain name or URL, providing such Owner control of such DNL ID, and providing various voice, data, and location-based services to parties using and/or owning that domain name as a DNL ID.

Biometric Attribute to Location Registry and Service

The systems and methods for creating a registry of locations related to and identified with various individual biometric attributes, including but not limited to fingerprint and retina scanning and voice, facial, and iris recognition, and the names, files, identifiers and other methods of referencing such attributes (collectively, "Biometric Attributes") include systems and methods for verifying and registering such Biometric Attributes and correlating such Biometric Attributes within a global registry and/or clearinghouse of such Biometric Attributes and the location(s) associated therewith. This registry is referred to herein as the "Biometric Attribute Location Registry" or "BAL Registry." The BAL Registry may utilize various Biometric Attributes and associate and register one or more locations to those Biometric Attributes in an international worldwide registry, repository, and clearinghouse directory that can effectively establish a globally unique BAL Registry identifier ("BAL ID") for a location, and use all or a portion of the BAL Identifier to acquire, reference, access, use, publish, and/or provide real-time information and services related to the one or more locations and/or the individual(s) or other entity/Owner associated with such individual(s) and Biometric Attributes and providing various voice, data, and location-based services to parties based upon such Biometric Attribute and/or participating in data or voice communications and conversations accessed by or related to such Biometric Attributes.

Proprietary Name to Location Registry and Service

The systems and methods described here include systems and methods for creating a registry of locations related to and identified with discrete proprietary names, Universal Resource Identifiers ("URIs"), or any other alpha numeric identifiers, including for purposes of illustration and description, but not limited to, Facebook user names or URLs (e.g., facebook.com/mcdonalds), email addresses, shortcodes, handles, and Twitter names in the format of "@SampleTwitterName" (all of such other alpha numeric names and identifiers are referred to herein as a "Proprietary Name"). This registry is referred to herein as (the "Proprietary Name Location Registry," and together with the PNL Registry, BAL Registry and the DNL Registry, and/or a combination of one or more of such Registries, a "Location Identifier Registry" or Location Identifier Registries" or "LID Registry" or "LID Registries"). The Proprietary Name Location Registry may utilize, verify, register, and curate Twitter, Facebook, and other Proprietary social media names and associate and register one or more finite or specific physical locations to that Proprietary Name in an international worldwide registry, repository and clearinghouse directory that effectively establishes a globally unique Proprietary Name Location identifier ("PN ID," and together with the PNL ID, the BAL ID and the DNL ID, the "Location Identifiers," or "LIDs") for one or more locations, and may use all or a portion of the PN ID to acquire, reference, access, use, publish, and/or provide real-time information and services related to the one or more locations and/or the Owner associated with that Proprietary Name, ensuring and curating that the PN ID is owned and controlled by the owner of the underlying Proprietary Name, providing such Owner control of such PN ID, and providing various voice, data, and location-based services to parties using or owning that Proprietary Name and/or participating in data or voice communications and conversations related to such Proprietary Name.

Primary Goals and Benefits

The goals of the LID Registry, Location Identifiers, and IAE Services include enabling individuals and services to instantaneously identify, reference, obtain a customized map or directions to, and utilize any specific physical location or locations that are directly and discretely registered and associated with various existing, and to be developed, discrete non-locational identification methodologies that are used for other, non-locational purposes so that those non-locational identifiers can be effectively and easily used as address and locational identifiers with easy integration and instant access within non-locational Devices and Services, including Internet browsing, phone calls, social media, and other types of digital services and communications. Another goal of the LID Registry and Location Identifiers may be to enable an extremely high level of accuracy (with real-time use and informational access controlled by the Owners of the underlying Non-Locational Identifiers) to publish, post, acquire or use information about, interact with, or physically visit or communicate with or about physical locations, including locations defined by two dimensional xy coordinates (e.g., latitude-longitude or grid references), three dimensional xyz coordinates (e.g., xy coordinates enhanced by height or altitude), or hierarchically based and structured locations with numerous levels of hierarchical geo-referencing (collectively, "Hierarchical Coordinates"), e.g., locker 15 on aisle D in room 241 on the second floor of the xyz building in Santa Barbara, Calif., USA. Exemplary embodiments of Hierarchal Coordinates and other features that may be included in the systems and methods herein are disclosed in U.S. Pat. No. 6,202,023, the entire disclosure of which is expressly incorporated by reference herein. Further, the LID Registry may enable the Owner of various non-locational discrete identifiers to associate them with one or more locations and instantaneously control on a real-time basis the connectivity between the non-locational discrete identifiers and the one or more locations or related information, the access by various parties to all or any portions of such information, and the ability to access various types of information related to the use of such identifiers and/or the persons accessing and referencing such identifiers and related information. This facilitates the ability of the Owner to identify and provide information and for Users to access location(s) and related information and services without having to utilize much longer, less precise, standardized and more ambiguous and cumbersome traditional street addresses, latitude-longitude coordinates, or other similar means of identifying and referencing locations that are often language specific and/or utilize different significant local knowledge, structures, methods, styles, colloquialisms, and/or even character sets and that are also not interoperable among devices and services. Further, the LID Registry facilitates globally interoperable Devices and Services for navigation, discovery, and access to location information, etc. through the utilization of global standards for location referencing by utilizing new types of universal and globally recognized non-locational identifiers for various things as a new type of new and universally and globally recognized location identifiers.

While there are various methodologies that are used to associate physical locations with names, addresses, and individuals, including traditional street addresses, names of governmental subdivisions, coordinate referencing systems like latitude and longitude, grid referencing systems, etc., these methods and systems require additional information to be included in a communication, consume precious space in advertisements and other communications (e.g. short messages like SMS and Tweets that are often limited to 160 and 140 characters or less, respectively, with Latin character sets (even shorter with other character sets like Chinese), typically are not capable of precise integration into existing Devices and Services, and are not sufficiently curated and precise enough to be fully interoperable and work perfectly in today's global digital environment. The LID Registry provides a discrete one-to-one association and relationship between the various non-locational identifiers and location(s), the Owners of such identifiers, and actionable real-time information and services about the location or locations associated with such identifiers that can be owned and controlled by the Owner of the non-locational identifier. Further, the LID Registry and the other systems and methods described herein enable the communication of a specific location(s) instantaneously, unambiguously, and simultaneously with the communication of the non-locational identifier, enabling shorter communications and interoperability among disparate systems. The LID Registry acts as a de-facto, ultimately global shortcode for locations because it enables precise locational addressing and referencing with non-locational identifiers without ANY additional characters.

Whether a phone number, domain name, Proprietary Name or other similar name, the LID Registry effectively makes any such non-locational identifier a location identifier that can be used as a trigger for any location information or services, typically at the discretion and subject to the control of the Owner, without the necessity of otherwise utilizing the phone number, domain name, Proprietary Name or other similar name for any such other services prior to accessing the location and location information and services. In addition, for purposes of telephone dialing keypads, and other interfaces, such as voice recognition and interactive voice applications, systems that are designed to be used throughout the world for recognizing phone numbers and completing phonecalls with the typical 5-10 digit phone numbers in use today are automatically capable and effectively totally compatible with and optimized for recognizing and utilizing PNL IDs, thereby optimizing the ability to use traditional telephone dialing keypads and eliminating the necessity of developing and optimizing voice recognition for long and cumbersome street addresses, latitude longitude coordinates, Hierarchical Coordinates, etc.

For example, the systems and methods described herein may enable the ability of telephone user interfaces and services that can present an End User with the option to call, view a map, obtain directions or other timely information about, and/or find or navigate to a specific location or multiple locations by merely adding a new button that utilizes the PNL ID to access the relevant information or services. FIG. 5 shows an exemplary embodiment of an electronic device including a Call icon or button and a Find icon or button. An exemplary method is shown for using the electronic device to access information regarding a physical location based upon a non-location identifier. FIG. 5 shows the following sequence: 1) the User dials phone number in the displayed dialer pad, or obtains it from a directory or scans it; 2) the User has option to call or find the location, 3) if the user selects the Call button calls, the User is given the option to Find the location before, during or after the call; 4) if the users selects the Find button, the user is provided a map indicating the location, with the option to get directions, call, or obtain more information. This sequence is continued in FIG. 6, which illustrates a sample web or other page that includes various information, features and services that could include, but not be limited to, the following:

Still provides a Call button
    Map of Location
    Expands to full interactive map
    Fixed or Variable Location for mobile phones
    One Touch directions
    Directions and Parking Tips customized by the Owner
    Live Traffic
    Social Media Sharing options fully integrated with the Phone #, SMS, email, or Twitter name
    More Info. Provided by Owner or Users
    Ability to Send a Text or other message to the Location
    Link to one or more Websites
    Post or view comments/photos
    "Locate me now link" to show current location of owner Further, the systems may enable simultaneous delivery of such locational information and services together with the traditional voice or text message telephone communication services. Importantly, the systems described herein also enable these services to be provided globally across multiple providers of telephone services by leveraging the existing telephone numbering plans and voice switching networks. Finally, the utilization of PNL IDs enable virtually every existing database of contacts with phones numbers to be used as a database of locations, without modifying the database or information contained in the database, because the PNL ID effectively becomes the locational identifier used to identify, navigate to, and interact with the location(s) associated therewith and/or to access real-time, updated information from the LID Registry either for one time use or to update the client-side database(s) used by the Devices or Service.

PNL IDs provide particular advantages globally for multiple languages for both voice and visual recognition because of the very limited subset of characters (zero through nine, or perhaps combinations of numbers) that have to be recognized in various languages, accents, etc. And systems that are already capable or optimized to recognize and use domain names and facilitate Internet and social media traffic and communications would be similarly benefited by automatically being capable of being used for location identification, navigation, discovery, communication, etc.

Numeric keypads typically contained on virtually all of the several billion landline and mobile phones throughout the world contain only a few (typically twelve (12) or so) keys (0-9 and 2-4 other keys (*, #, etc.). While these keypads also contain alpha numeric conversions to enable the Users to effectively type an address like 1733 Main Street, Bakersfield, Calif., entering such alpha numeric characters on a keypad is extremely cumbersome, time consuming and very error prone. It also requires a form of triple tapping or some other methodology to select the actual alpha character (of the three or four (3-4) possible characters) associated with a particular number. With a typical triple tap system in place today, it may require approximately fifty (50) additional keystrokes to input the foregoing sample address in addition to the phone number of a PNL ID. Further, the traditional street address might not be resolvable by the phone system, and even if resolvable, might not resolve accurately or be linked to curated, real-time information contained in the PNL ID. Further, many locations throughout the world do not have effective street addresses, and physical navigation is often haphazard, requires local and colloquial knowledge, and/or is generally not effectively curated. And while latitude and longitude could arguably serve as a universal, numerically driven language, there are numerous formats for latitude-longitude coordinates (e.g., degrees, minutes, seconds; decimal degrees; decimal minutes; decimal degrees, etc.) and such coordinates are incredibly long (e.g., 112 degrees, 32 minutes, 52 seconds east longitude, 32 degrees, 23 minutes, 18 seconds north latitude), confusing and difficult to remember, associate, communicate, input into a device via keyboard, voice or other means (even scanning may be difficult because of the different formats and length). The seven (7) or ten (10) digit phone number is substantially shorter, and in many cases is already being used and inputted with the device, which typically has systems and methods to associate such numbers with businesses and people, so there are no additional keystrokes required to input the PNL ID if it is already present in the phone or previously inputted for use. Even if the PNL ID is not already in the phone or inputted in connection with a call, text or other communication, entering up to a ten (10) digit telephone number on a mobile phone as a PNL ID for a location is substantially easier, universally understood, globally universal, simpler, faster, less error prone, and more effective than entering any other type of locational identifier or address. Further, the PNL ID may be used for multiple purposes: making the phone call, sending an MMS, SMS or text message, or identifying a location with infinite precision and obtaining real-time location related information or services regarding that location, subject to the control of the Owner of the PNL ID. Thus, a Users may be offered the choice upon selection of a phone number whether to call or find, navigate to, or learn about a location or Owner. Finally in this regard, numbers are a universal character set and language throughout the world, whether in China, the United States, France, or Egypt, and therefore PNL IDs greatly facilitate global location referencing by persons unfamiliar with the local language(s), structures, and nuances used in traditional street, delivery and mailing addresses throughout the world.

Because the LID Registry may contain multiple types of non-locational identifiers correlated to one or more location(s), the LID Registry may potentially enable the reverse correlation from one type of non-locational identifier (e.g., a phone number) to another non-location identifier (a domain name or Proprietary Name) for the same locations. This correlation and cross-correlation may enable crawlers and spiders used by search engines and others to create substantially more locationally aware, precise, and location-enabled indexes, thereby facilitating more timely and relevant search results tied to locations. Because the LID Registry correlates multiple, perhaps all types non-locational identifiers that are associated with locations, the LID Registry enables new types of search and information acquisition regimes that begin and are centered around real-time accurate, potentially infinitely precise locations, potentially based on Hierarchical Coordinates, and related information thereby enabling new and powerful ways to publish, access, correlate and disseminate location based services.

One of the advantages that is unique to the PNL ID is the ability to enhance and integrate SMS, MMS, text messaging, and other mobile phone and telecommunications services (collectively, "SMS Services") in addition to phone-based voice services since such SMS Services typically utilize traditional phone numbers to identify the recipient(s) and transmit communications. Thus, in addition to services automatically attaching locations and related information and services to phone calls, the PNL ID enables services to automatically attach locations and related information and services to SMS Services.

The LID Registry is designed to provide fully curated, verified, discrete, and extremely accurate one-to-one correlation between the various components of the LID Registry and the location(s) associated with the LID(s). Thus, the LID Registry may enable the direct association of a phone number, domain name, Proprietary Name, or Biometric Attribute to one or more specific locations. That association, and the Owner's ability to alter, adjust, filter, and/or control the dissemination of the LID or the location and information associated with the LID to one or more persons or groups of persons based on a variety of factors (their identity, membership or association with certain groups, current or projected location, or other Contextual information on a real-time basis, via the LID Registry, will typically be owned and controlled by the same Owner that owns or controls the associated phone number, domain name, Proprietary Name or Biometric Attribute, enabling such Owner to provide instant, controlled and correlated access to one or more locations or related information about that location to a User using, accessing, or referencing any such phone number, domain name, Proprietary Name or Biometric Attribute across multiple services.

One of the other advantages of the PNL ID is the ability to fully integrate with the telephone routing and switching networks based on the location of the Users. For example, a person located in Chicago Ill. 312 area code could only dial the local seven (7) digit, 312 area code number, without having to input the local area code, and the system could automatically prepend the 312 area code to the PNL ID much the same way that the telephone switching network prepends the area code for purposes of routing a telephone call. Thus, the hierarchical nature of the telephone switching networks, including area codes, provider codes, and international calling codes, may be easily and seamlessly integrated into the registration and utilization of PNL IDs.

The LID Registry may also enable numerous asynchronous and synchronous services, either independent of or dependent upon other services, to instantly access and integrate location(s) and location information via the LID Registry. Some of these services are further described below, including services separate and distinct from, and those that that are integrated and coordinated with, the underlying services that utilize the various types of LIDs.

Registry and Verification Modules

The LID Registry of LIDs and related locations is intended to be a fully curated, verified, and structured in a way that ensures and maintains the integrity of the LID registrations, the ownership of the various LIDs and the associated one or more locations in a manner that ensures that Users utilizing the LID Registry are able to resolve, publish, and acquire real-time information and services about, and otherwise correlate any LIDs in the LID Registry to and with the associated location(s) and related information and services.

In order to ensure that the LID Registry is adequately verified and curated, processes and procedures may be established during the course of creation, maintenance, deletion, and use of LIDs to establish the appropriate connection between the registrant/Owner of the LID and the associated location. For example, part of the registration process for a PNL ID may be communications with the Owner of the phone number proposed to be associated with the PNL ID and location(s) through telephone networks via a phone call, text, or other message to the phone assigned to that specific phone number, or some other methodology designed to ensure that the recipient of such communication is, in fact, the Owner of such phone number. Similarly, part of the registration process for a DNL ID may be communications with the Owner of the domain name(s) proposed to be associated with the DNL ID and location(s) via email or some other methodology designed to ensure that the recipient of such communication is, in fact, the Owner of such domain name. Any such process and procedure may involve the Registry and Registrars of domain names currently operated by the Internet Corporation for Assigned Names and Numbers (ICANN) and the various entities participating in the domain name registration process in order to reach and communicate with the registered Owners or representatives of the registered domain name to be used as a DNL ID.

Similar or other processes and procedures may be utilized to ensure the validity and ownership of PN IDs and BA IDs, and Owners may be notified of such verification and/or the details (method, date, etc.) of such verifications.

Some of the unique attributes of telephone numbers are their use globally throughout the telephone and voice switching networks, the assignment of phone numbers in a manner that is unique and resolvable within any country or other jurisdiction or telephone system, and the methods that are used by the operators of telephone systems to ensure that users in one country can effectively reach and call users in other countries via the existing international calling structure of exit codes, country codes, etc. The LID Registry and related services may therefore interface and integrate with such systems and processes in a manner that allow End Users to locally, regionally and internationally dial a phone number and/or reference a PNL ID before, during after a call, SMS, 411 or other similar communication or service in a manner that is seamlessly integrated into the operating system for such communications, effectively adding microlocational aspects to any such activity. For example, someone who is within or using a phone number in the 417 area code in the United States who is able to dial a 417 area code phone number in the U.S. to access a landline or mobile phone within that area code may similarly be able to dial or otherwise use that same sever (7) digit number within the 417 area code in order to obtain designate, reference, or access information or services about the location and related information associated with the full ten (10) digit number including the 417 area code. For example, dialing 866.5945 in that area code and selecting the Find function would utilize the full PNL ID of 417.866.5945 to reference the location associated with such number, even though the End User only input the local number. Thus, methods and systems may be established to allow correlation of a full PNL ID even in the event that the full PNL ID is not input or selected, thereby enabling locational information and services to be accessed in a manner virtually identical to the way voice phonecalls are accessed and utilized. Such locational services may thus be faster and easier to access, and more integrated with the traditional voice, SMS, 411, and other communications services, including integration with client, server, or other contacts, databases, and other systems for maintaining directory, contacts, and other information. It may also be possible to utilize alternative mechanisms for designating countries or other high level identifiers for phone numbers instead of area codes. For example, instead of using the numeric country code for China (usually 86), PNL IDs may select or enter the name China or a recognized shortcode (e.g., CN) followed by the local phone number sequence. Similarly, for those numbering plans that assign phone numbers based on the telecommunications carriers, such system may substitute the name of the country and/or the carrier in lieu of the numeric codes typically associated with such country or carrier.

Access and Control Modules

The LID Registry and all of the related components generally include various software and interface modules that enable Owners to establish, manage, and change the ability of Users to access the components of the LID Registry from time to time on a real-time basis. Such access and control modules may enable Owners to designate, for individual or groups of LIDs, which Users can access and utilize such LIDs to access, either with or without conditions and Contexts (e.g., only End Users that meet certain geographic ranges and/or time windows, for example, within 25 miles of the location can utilize the LID during the hours of 8 a.m. and 8 p.m. local time) and to what extent they can access, the location(s) and related information and services associated with such LIDs. For example, the owner of a PNL ID, DNL ID and/or PL ID that is associated with a food truck that is desirous of letting all End Users access its current or projected location by merely referencing any of the forgoing LIDs may authorize anyone to access the relevant location(s) and information during operating hours, but then only authorize certain End Users, or End User meeting certain criteria like Facebook Friends, access such information during other times, and perhaps authorize no one (except close family members) from accessing current location information during other times.

Access and Control Modules may also include various gating items (including passwords, challenge questions, other verifiable first, second, or other tiered relationships (e.g., friends on Facebook, followers on Twitter, and the like), conditions (e.g., attended the same high school, etc.), geographic location, ranges, and/or logic of all types (including Hierarchical Coordinates) (e.g., only End Users within ten (10) miles (or further than five (5) miles) or people that are (or are not) located at a particular location (e.g., in a particular store or room on a particular floor of a specific mall)) to access the LID information and services. In addition, the LID Registry may be combined with tracking, reporting, and accounting systems that account for factor usage and/or enable various micro- or other payment or revenue sharing components to charge and/or compensate End Users and/or Owners for the use of or access to the LID Registry and/or the locations or information provide or access thereby. Such charges may be absolute or variable, and/or based on various formulas, minimums, maximums, or aggregate ceilings or floors. For example, Owners of LIDs may offer to pay Users (either actual mobile or online phone Users or others who incorporate LIDs into various hardware and software) to use the LIDs, synchronize separate databases and services with the LIDs, or cause others to use the LIDs. Similarly, Users may pay Owners for creation, publication, cloning, access to, and/or use of LIDs and related information in various ways, including micro-payments for use or access by the Owners or Users, or for the distribution and use of LID and related information.

Access and Control Modules may also be used to prohibit access to a location by certain Users or only provide limited information and temporary access. For example, instead of an Owner providing a new acquaintance their permanent phone number and/or the details of the Owner's traditional street address, which is essentially a permanent description of a location, in order to allow the new acquaintance to visit the Owner's residence, an Owner may simply permanently or temporarily enable the User to use that phone number or other LID to access the location of the Owner's residence and/or information related to such residence. This would be both faster and shorter (indeed it requires NO additional information other than the phone number in the case of a PNL ID, which is being provided anyway), but it is also substantially easier to remember or write down, and it is less susceptible to errors. If the Owner then subsequently determines that the particular User should no longer be able to obtain access the location of the Owner's residence, the Owner may quickly disable the acquaintances ability to access or utilize the PNL ID or other LID, effectively providing the Owner the ability to alter the access of a User to the location of the Owner's residence. Similarly, Access and Control Modules may have related services that effectively modify any databases or others services that included such PNL IDs that might reside outside of the LID Registry. This system may enable both springing and disappearing access to locations based on a number of factors, including triggers controlled by the Owner, usage, other qualifications of Users or services used by Users, etc. Such Access and Control may be exercised in general ways to impact various Users, or it may be exercised on a User-by-User basis for certain Users.

Location Control Modules

The LID Registry and all of the related components may contain various software and interface modules that enable Owners to establish, manage, and change the nature and extent of the various location information provided to Users. Such location control modules may enable Owners to designate, for individual or groups of LIDs, or for specific individuals or groups of user or services, the precision, nature and extent of the location and/or location information accessible or provided to users accessing the information through LIDs, and/or may allow Owners the option to block information to various Users, provide general location information (e.g., at the country, city, state, place or zip code level instead of more precise street address or latitude-longitude coordinate) or highly precise information (e.g., exact street address, building, and even floor or room number information), Hierarchical Coordinates, current or projected information location, and the like. If multiple locations are associated with any specific LID, Owners may select which locations and/or related information is provided based on various factors, including the identity or nature of the User, the location of the User, the day or time of the request, or other Contextual factors designated by the Owner. For example, an Owner may use or enable a PNL ID in a classified or other advertisement for the sale of an automobile, and associate the LID with a physical or geographic location of the automobile, e.g., one or more of: a) a temporary location where the automobile is on display for the day, b) the exact location of the automobile by accessing real-time GPS or other tracking and location information from the automobile, c) move or disable the designated location from time to time, or d) automatically upon the agreement to sell, or the initial or final payment for, the automobile, terminate the LID completely.

Vertical Location Registry Services and Search

One of the advantages of the LID Registry is the ability to provide a global system that may tightly correlate and associate location(s) and related information and services with other discrete identifiers that are used for other global naming and referencing services typically unrelated to location services. For example, the Access and Control Modules and the Location Control Modules may include or be integrated with various other vertical services that may be provided separately or simultaneously with access to the locations and/or related information in the LID Registry. For example, a User that has obtained a phone number from a print or electronic directory, flyer, business card, brochure, billboard, television or radio advertisement or other communication including such number may perform one of multiple available actions, for example, one of: a) the User may make a phone call using the plain ordinary telephone service (POTS) or a Voice over IP (VoIP) telephone service, b) the User may utilize the phone number as a PNL LID to access a location or location information and services via the LID Registry or services integrated with the LID Registry without initiating a phone call, or c) before, during, or after such phone call, the User may be provided the option to access the location or related information and services related to such phone number automatically in lieu of or simultaneously with participating in a telephone call without the necessity of remembering and inputting the street address associated with that location. Such services may be displayed on an electronic device, e.g., on the display of a Smart phone, tablet, computer, and the like, into which the User has entered the PNL LID, and such services may include, without limitation, a) displaying a static and/or digitally produced map or directions to the location, b)

displaying the hours or visual representation of the hours of operation of the location, or c) displaying the weather at the location, d) displaying or otherwise accessing multiple phone numbers for various services or departments at the locations without the necessity of having to utilize any existing interactive voice response systems, e) entering a live chat room or viewing comments about the location, and the like (all of such services, whether or not enumerated specifically herein, are collectively referred to as the "Services"). Similarly, a User may be able to access such information during the course of a telephone call, but only at the request, direction or approval of the Owner or other authorized person that is a party to such a call.

Similarly, the correlation between a domain name, a Proprietary Name, or Biometric Attributes and one or more locations through the LID Registry may enable the immediate provisioning of various Services simultaneously and/or integrated with other typical services associated with such domain name, Proprietary Name, and/or services that utilize Biometric Attributes.

The existence of the LID Registry provides numerous opportunities to provide value added services related to various traditional services and new location based services. For example, PNL IDs may be provided in such a way as to allow numerous locations to be associated with one traditional phone number. Thus, the traditional 1.800.BrandXY (1.800.272.6399) toll-free telephone phone number may be resolved immediately to LID Registry information related to every location of Brand XY stores, or stores in the LID Registry where Brand XY products and services may be obtained, thereby enabling an advertisement to display/communicate only the phone number yet enabling the End User to immediate access real-time information, e.g., about the closest location of Brand XY stores or stores that carry Brand XY products. In addition, the Owner may add additional numbers or extensions to a communication in order to resolve to a sub-groups of locations or only one locations. So 1.800.272.6399.145 (including the primary PNL 1.800.272.6399 along with an extension 145) may resolve to one specific location and related information to enable navigation to that specific location and/or providing locational information or other data, a pre-recorded message, and the like that was associated with a specific single location. This may enable the Owner to effectively brand and communicate their general toll free number while providing more granular location information and ad specific locational information services. Such extensions may be used for a variety of other services, including tracking and reporting. This capability may be enhanced using the LID scanning capabilities described elsewhere herein.

Similarly, a real estate agent that has thirteen (13) separate listings of properties may advertise her number for each property as 412.323.1123.1, 412.323.1123.2, . . . 412.323.1123.13. Thus, someone dialing and calling her number 412.232.1123 would reach her and/or all of the associated locations, but if they dialed the additional numbers (e.g., 412.232.1123.4), they would reach a custom message or information for the associated specific individual location, or they may use the LID Registry to navigate to or learn about the specific location. Similarly, an Owner that wanted to track and participate in pay for performance or other revenue sharing based on traffic may combine a series of new or existing LIDs under one overarching LID by adding additional characters after the primary LID, effectively aggregating all of such traffic under one primary LID. Domain name IDs may also be extended to operate in a similar way, with extended Universal Resource Identifiers (URIs) (e.g., http://geo.to/rubys.com/newport) being registered and associated to identify a specific location in Newport Beach in order to provide or access specific information and services related to the specific location. All URIs that are not so registered and associated may all be associated with the same primary location(s) that the basic domain name (e.g., rubys.com) was associated, essentially enabling a 'default' location reference for any URI that was not specifically registered and associated as an LID. Similarly, the LID Registry may utilize extended numbers to automatically associate the number with specific locations and/or specific types of information and services about the locations, or extended numbers, letters or characters may be inserted as a temporary passcode for temporary availability of locational information that may be disabled by the Owner at any time. In addition or alternatively, the extended numbers or characters may be included for purely information or descriptive purposes so that the registered LID conveyed more descriptive information to the End Users. Similar extended and hierarchical LIDs and services may also be associated with other types of LIDs, such as those described elsewhere herein.

Further, the existence of the LID Registry may greatly facilitate services that enable Users to search for, find, view, learn about, get directions to, or access, call, and/or visit specific locations throughout the world by enabling various tools and services that enable Users to input or otherwise provide and communicate global identifiers such as phone numbers, domain names, Proprietary Names and/or Biometric Attributes in order to directly access specific locations and related information for other purposes, like shipping or delivery services. Similarly, someone searching for a domain name, phone number, Proprietary Name may automatically be provided with specific locations from the LID Registry associated with any of the other of such domain names, phone numbers, or Proprietary Names.

Open Clearinghouse, Pay Per Use, Revenue Sharing and Accounting

One of the advantages of the LID Registry is the ability to provide access to locations and related information in the LID Registry to any User, whether a User is utilizing such information for its own use or to provide or enhance products and services provided to other Users. This further enables Owners to control on a very efficient and real time basis, through the various modules and other methods and systems described here, the locations associated with any LID, access to that location and/or the nature and extent of the information and services made available to any User.

Users may access such information as needed and remotely through the LID Registry via any of the LID IDs or other attributes associated with any such location(s) and related information and services without having to store and maintain such information separate from the LID Registry. On the other hand, should any such User determine to maintain and keep such information separate from the LID Registry, if authorized by the Owner to do so, any such User may continue to access the LID Registry via any of the discrete LIDs (phone numbers, domain names, Proprietary Names, etc.) and instantly update and synchronize any such information contained remotely with the information in the LID Registry at any time, and the LID Registry essentially enables and facilitates the open access of information across all Users and services, or alternatively only to those authorized by the Owner from time to time. This Clearinghouse function essentially enables the updating and synchronization of any of the millions of databases of locations that contain any of the various locations identified by PNL IDs.

End Users who access their personal contacts database may be prompted to update the location and other information regarding the contact represented by the PNL ID, and the PNL ID may be used to access the clearinghouse to obtain real-time updates of the contact information, all subject to the control of the Owner of the PNL ID. Further, domain names, Proprietary Names, and Phone Numbers are structured in a manner that they are virtually always discrete identifiers with no overlap or ambiguity, subject to various systems already in place (e.g., the numeric country code prefix for Phone Numbers in different countries) and/or described herein to ensure that the LIDs may be used universally throughout the world to uniquely identify locations and related information and services.

In addition to the clearinghouse features described above, the LID Registry may facilitate the publication and use of LIDs by enabling a micro-payment, pay per use, or pay per performance solutions or other non-financial incentives (collectively, "Payments") that can track, account for, report, and resolve Payments to Users from Owners, or payments to Owners from Users, all on a real-time basis. For example, Owners may offer Payments to Users to encourage the use the LIDs for various reasons beneficial to the Owner, and Users may offer Payments to the Owners to be entitled to use the LIDs and related information for various reasons beneficial to the Users. In addition, the LID Registry may enable real-time bidding or Payment solution and integrated accounting system designed to track and account for the nature and amounts of Payments due to or from Users and Owners.

Further, the overall Payments described above (or other Payments based on revenues, or profits, or some other measure of success of the operator of one or more of the LID Registries, or companies that are participating in the operation or use of the LID Registries) may be paid to third parties designated by Users, Owners, or others in order to provide an incentive to Owners or Users to utilize LIDs for various purposes, including cause marketing to benefit charities and other unrelated or related third party beneficiaries (collectively "Beneficiaries"). Such Payments may be allocated to such parties based on actual usage of LIDs on a micro-payment basis per usage, or on the overall usage of LIDs or certain types of LIDs. For example, rather than providing that a User, Owner or Beneficiary pays or receives a set amount, e.g., $0.02, per LID usage in a manner that achieves a very high correlation between the usage and the Payment, in order to encourage the use of LIDs but avoid or minimize the opportunities for fraud or other exaggerated use of LIDs, the accounting system may keep track of all LID Usage in a manner that avoids directly correlating any specific LID usage with specific Payments to any User, Owner or Beneficiary. This may be accomplished by such Owners, Users and Beneficiaries being allocated points or some other measure of usage that do not correlate the payment directly with the usage. In such event, Payments by or to such parties may be based on the total points or total usage or other measure earned or accumulated by such party as a percentage of the total points or other usage tracked, earned, or accumulated by all of such parties, or any sub-groups of such parties. Such groupings may be based on any distinguishing characteristic of such Owners, Users or Beneficiaries, the type of User or Owner, geography, categories, or even arbitrary characterizations. The clearinghouse and accounting systems and methods may be designed to track all of the usage of LIDs and related activities in order to enable either type of "correlated" or "uncorrelated" usage and Payments, or anything in between.

Replicating and Cloning Locations

Owners and Users may be provided with tools for the use and creation of new LIDs through the instantaneous and expedited replication and cloning of locations and location related information, with multiple options to replicate all or selected pieces of information about a location, e.g., adjust a location or provide more or less precision or adjust the hierarchy, relationships, and other locational and non-locational information related to the location being cloned, add to, delete, or revise all or any portion of the information associated with a LID in a manner that facilitates the creation and benefits of LIDs. In connection with the creation of new and replicated LIDs, the systems and methods described herein may enable Users to become an Owner of a new or replicated LID with one click, thereby cloning the location and creating a new LID location using all or any portion of the location or locations and/or the information associated with the location(s). Further, the new User/Owner may be entitled to instantaneously add information, adjust and/or add to the LID for such location for purposes of creating extended information, connecting the new LID to its "parent" LID and location, and the like. Such adjustments may be based on one or more of User designated, learned and stored preferences or Context, learned and recorded activities of Users in order to predict and provide the most typical cloning methodologies used by such User, adjust or not to reflect the various Contexts related to the cloning, including the general location (e.g., near the User's home, work or other saved location v. a location that is associated with or relevant to a foreign country, a plan or anticipated travel (including a prediction or designation as a business or personal trip), a location that is relevant to or potentially associated with a news item of current interest, what is being or was recently viewed by the User, date, time, weather, or other Context, and/or what information is designated by the owner of the cloned location to be transferred automatically to the newly created LID and/or available to the User to transfer to the cloned LID, all with a view toward enabling the User to instantly clone and thereafter customize an LID and location information associated with the LID with one-click or as few clicks as possible. Further, the systems and methods enable the Owner of the LID to suggest, provide, and/or in some cases control the information associated with the LID that is cloned that is automatically transferred to the LID that results from the cloning.

Modified URL Input Tools

Special access, selection, input, editing, and verification tools may be provided to facilitate the creation of PNL, DNL, PL, and BAL IDs, including the automatic insertion of characters, sequencing, groupings, etc. to automatically conform to the requirements of the Registry and localized languages and customary presentations of phone numbers, domain names, Proprietary Names and/or industry standards for identifying various Biometric Attributes. For example, Owners creating and registering PNL IDs for a location in China will be able to input characters (letters, numbers, and other characters) without the necessity of inputting any special characters, separators, etc. and such PNL IDs may be formatted in the same format as phone numbers in China. Similarly, for extensions and associating multiple locations with phone numbers and domain names as described above, characters may be automatically or optionally inserted for a variety of reasons, including readability, conveying additional information in the registered LID, assisting in resolving and parsing the LID, providing only temporary access to the LID information, or providing hierarchical structures or additional descriptive information for Users or parsing tools, etc. Thus, an Owner who registered a DNL ID for, or who added an extension for "Corona del Mar," may benefit from input mechanisms that automatically inserts dashes (-) between each word in order to avoid blank characters, improve readability, and the like. Such auto-completion algorithms, systems and methods may be used for persons creating LIDs or using LIDs to designate, search for, reference or share locations, or obtain or share information related to such locations, and any such auto-completion systems and methods may also automatically provide certain types of information associated with such LIDs.

Phone Number and Other Tracking Benefits

One of the developments in the last several years is the proliferation of so-called Call Tracking Numbers, which are multiple phone numbers that ultimately resolve to the same phone number but that are used to track the origin of the display or advertisement giving rise to the use of such numbers. Thus, an advertiser may place several different phone numbers in different ads that all resolve to the same phone number, thereby enabling the advertiser to measure the callers that derive from the various advertisements by tracking the traffic on each number. One of the advantages of the LID Registry described herein is that all of such numbers may also be used to provide Users with access to location(s) and related information and services separate and distinct from the making of a phone call, yet the call tracking numbers may still provide the source and origin information to the advertiser. Thus, existing call tracking numbers and systems may be instantly used and converted to tracking of the origins of Users who seek information about locations, request directions, physical visits, or text messages, or sales, or whatever through virtually any electronic navigation device.

While the foregoing describes the use of multiple phone numbers associated with the same locations for tracking purposes, the same benefits and opportunities may be derived from utilizing multiple Domain Names or Proprietary Names (or extensions) associated with the same locations for tracking purposes.

Biometric Attribute Use Cases

Regarding Biometric Attributes, which would typically be associated with individuals who might also be correlated to a mobile or landline phone numbers, domain names or Proprietary Names, files or other referenceable names associated with such Biometric Attributes, the systems may correlate specific Biometric Attributes with locations and related information. For example, the Owner may want to associate one or more of his or her (or its in the case of animals) Biometric Attributes with a specific location, in order to verify with near-absolute certainty that the Owner or other person, animal or other thing was, in fact, physically at that location by utilizing the Biometric Attribute of such Owner or other thing to verify that the Owner or other thing was at a specific location, thereby allowing Users to associate that Biometric Attribute, or filenames or other identifiers associated with such Biometric Attribute to any such location. Such location may also be variable so that a User can verify the location of such Owner or other thing from time to time, or to access a list of historical dates, times and verified locations of the Owner or other thing. Similarly, the Owner of the Biometric Attribute may be able to provide certain Users access to verify the past, present or current location of the Owner or other thing by using the Owner's Biometric Attribute to automatically provide User with the location of the Owner at given places and given times. In the case of Biometric Attributes, the Access and Control Modules may prohibit anyone gaining access to the location of the Owner of the Biometric Attributes unless certain conditions set by the Owner had been met. For example, a person wanting to provide a springing 'bread crumb'-like trial of their movements and activities may utilize their Biometric Attributes, e.g., a finger print obtained by a finder scan, at various locations throughout the course of a solo trip, while establishing Access and Control limitations on anyone accessing such location information unless the Owner does not either reset the instructions or subsequently utilize a Biometric Attribute to establish a new location within a set period of time. This sort of 'springing' location access may automatically create an alarm and historical location references of the Owner's activities and movements to appropriate Users in the event that the Owner becomes incapacitated, lost, or otherwise inaccessible.

The ability to add Biometric Attributes and associate them with locations, as well as the ability to associate other LIDs with locations, and thereby effectively indirectly associate Biometric Attributes with other types of LIDs, may also be used to verify LID ownership across various LIDs and essentially eliminate the ability of individual owners to create un-verified or multiple phone numbers, domain names or Proprietary Names, furthering the purposes of the systems and methods described herein to provide extraordinary verification, association, and curation of LIDs to locations and location information and services. For example, the use of Biometric Attributes and locations may be the basis of a system that eliminates the ability of individuals to create numerous aliases or identities throughout the Internet via multiple Proprietary Names, Phone Numbers, or Domain Names and provide Users with the ability to utilize Biometric Attributes to verify the identity of a person, whether associated with a location or not, for mobile security and identity purposes through registered facial recognition, iris or retina scans or digital fingerprints. Thus, persons who are interested in sharing information or resources (car pools, residences, and the like) may require all participants to provide their Biometric Attributes to be associated with locations or otherwise to verify the participants' identities through some form of registration and verification processes.

Curating and Verifying

The PLN Registry may be maintained by one or more Registrars and Registries that collectively control the assignment and verification of ownership of phone numbers, domain names, Proprietary Names and/or Biometric Attributes, to the extent applicable. Such Registrars and Registries may be separate from or composed of providers who are also registrars and registries of domain names, telephone carriers, operators of services like Twitter, or others.

Instant Access Methods and Examples

There are a number of instances of access methodologies and functions of IAE Services provided through online and mobile websites accessed through Internet browsers and other applications and services. Importantly, these IAE Services are intended to relate to, and automatically be Contextually associated with, the underlying web site, application or service, as well as enhanced by personalization related to the End User and the Context of the use, all of which is accomplished a number of different ways. The systems and methods herein are configured for associating, verifying and curating the ownership of domain names, URLs, and associated websites and URLs that enable access to various web-based services, including those provided by browsers or applications accessing websites and web-based information, and those systems may be utilized to ensure that the IAE Services associated with any website or application may be controlled by and/or based on information provided by the Owner of such web site or application (either prior to or simultaneously with the use of such web site or application) and/or personalized for the individual End User.

One of the advantages of the Instant Access Methods is the ability to quickly and easily provide a persistent visual queue or icon on every mobile and online website or other service that does not otherwise interfere with the content, services, or presentation of the underlying website. The queue or icon may be selected to instantly access and display IAE Services, customized for both the End User and various Contexts related to the End User or the Use, that may enable instant access to core functions like maps, directions, images, traffic, calling, texting, emailing or similar services, yet also not impact the underlying service by enabling the instant exposure and hiding of such services by the End Users to access the underlying website or services. Such IAE Services may also be loading, determining the identity or location of the End User, analyzing various other data or Contexts, and/or customizing or pre-provisioning the IAE Services in the background for instant access on demand by the End User. Advantages of the IAE Services may include one or more of speed and ease of access and use, simplicity, accuracy, persistent availability, safety, and/or effortlessly customized services with minimal interference with the underlying services or information.

Importantly, IAE Services may be provided by the Customized Location Services and/or the Cross-Service Systems in a manner that the End User isn't aware of the exact provider of the IAE Services but that seamlessly integrates such IAE Services with both the Customized Location Services and/or the Cross-Service Systems. For example, the IAE Services may be imbedded in browsers, extensions, plug-ins or modifications to such browsers, or provided by the underlying websites or applications accessed by such browsers or other applications. Thus, the End User may be more inclined to use the IAE Services for a new or unfamiliar Customized Location Service because the look, feel, functionality, and/or capabilities of the IAE Services are similar to and familiar to the End User, and/or because the End User expects, knows, or believes that such services are provided by a trusted provider of the IAE Services and not the underlying Custom Location Services, and/or because the IAE Services are personalized for the End User despite the fact that the End User has never before visited or used the specific Customized Location Service enhanced by the IAE Services in the past. Further, the IAE Services may be more easily provided, familiar, recognizable and usable across multiple devices and services, providing numerous advantages for all of the End Users, the Customized Location Services, the IAE Services, and the Owners of various locations sought to be found, learned about, visited or contacted by the End Users.

Finally, the provision of IAE Services via the utilization of Cross-Service Systems, combined with the independent operation of the Cross-Service Systems, facilitates the provision of the Cross-Services Systems, particularly complicated, comprehensive and unique services, with only nominal programming within the Customized Location Services to expedite and facilitate the launch and operation of the IAE Services.

For example, a webmaster may incorporate all or any portion of the Cross-Service Systems by merely adding one or two lines of programming code. Further, such code may incorporate and use static LIDs to reference specific locations (e.g., HI.JWACA for a specific Holiday Inn or HI to reference all Holiday Inns). Such code may also utilize dynamic LIDs by searching for any LID in a URL or content displayed on the page or from other codes and LID identifiers imbedded within the code for the page.

This approach, separate or combined with the use of LIDs, enables the integration of comprehensive and extensive Cross-Service Systems and IAE Services that are provisioned and/or enabled over a network such as the Internet and/or utilized or integrated with device and client-side operating systems, controls, services and information without the necessity of any (or only nominal) custom coding or integration by the Customized Location Services, which may all be handled and pre-provisioned through the Cross-Service Systems.

Examples of Cross-Service Systems and IAE Services

The IAE Services are enhanced and enabled by the utilization of various Cross-Service Systems designed to make it easier and more expedient for End Users to determine, select and obtain the benefits of their preferences, personal and other information, Context, historical and biometric and other information across multiple IAE Services instantly and without the necessity of personally providing any such information to any specific Customized Location Service. This approach not only makes additional, enhanced services instantly available to End Users without the necessity of such End Users logging in or otherwise inputting, selecting or expending time and effort to provide information or otherwise interacting with the IAE Service, but also enables and provides additional privacy, preferences and tracking advantages to End Users and enables certain IAE Services.

Figure 24:
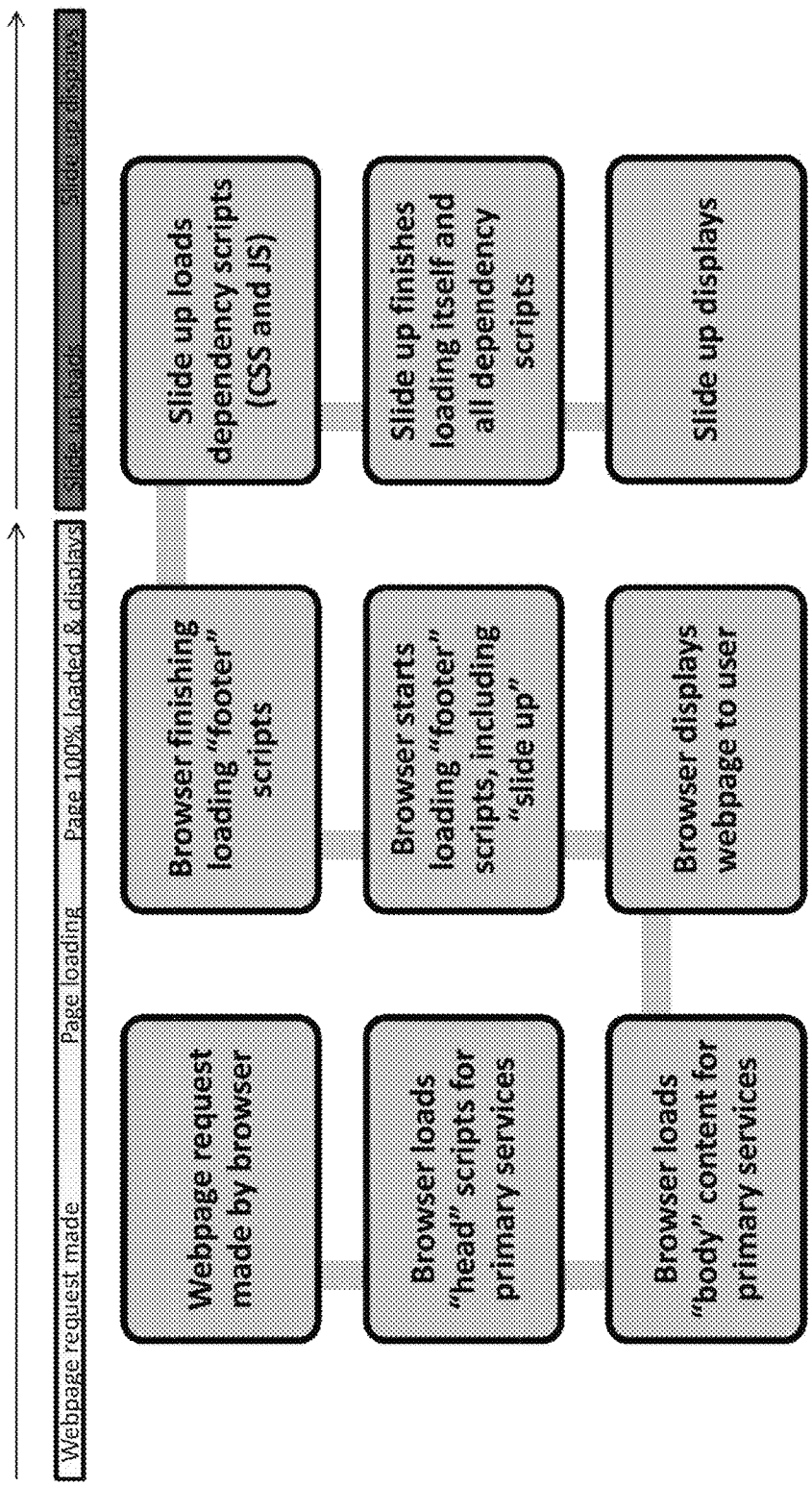
FIG. 24 is a schematic drawing showing an exemplary IAE Services access, loading, and display process where the IAE Services are integrated with and accessed by an underlying website being displayed. The process may include the following: 1) asynchronous loading subordinates Cross-Service Systems to Customized Location Services, and 2) IAE Services are fully synchronized with Cross-Service Systems for end user across all IAE Services.
Figure 25:
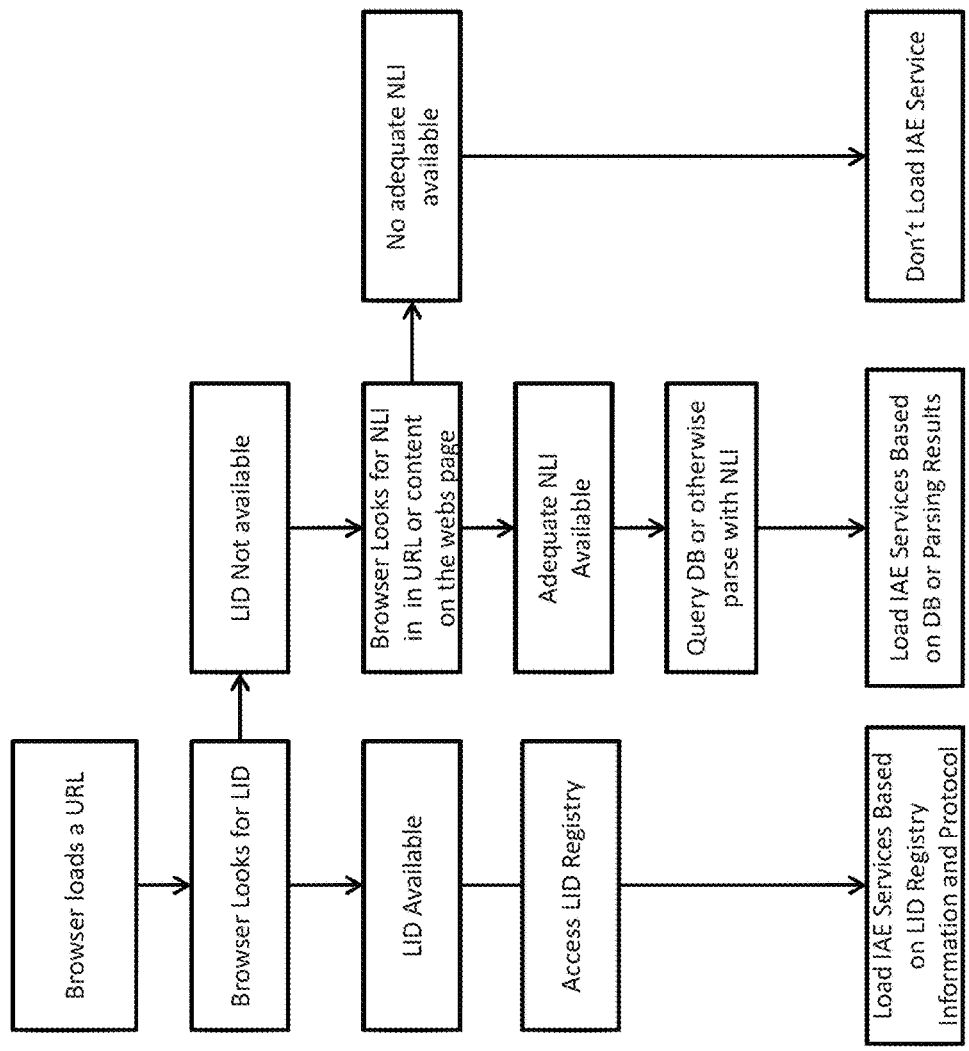
FIG. 25 is a schematic showing an exemplary IAE Services access, loading, and display process where the IAE Services are accessed directly by the Internet browser or operating system of the device including exemplary additional steps associated with using LIDs.
Figure 26:
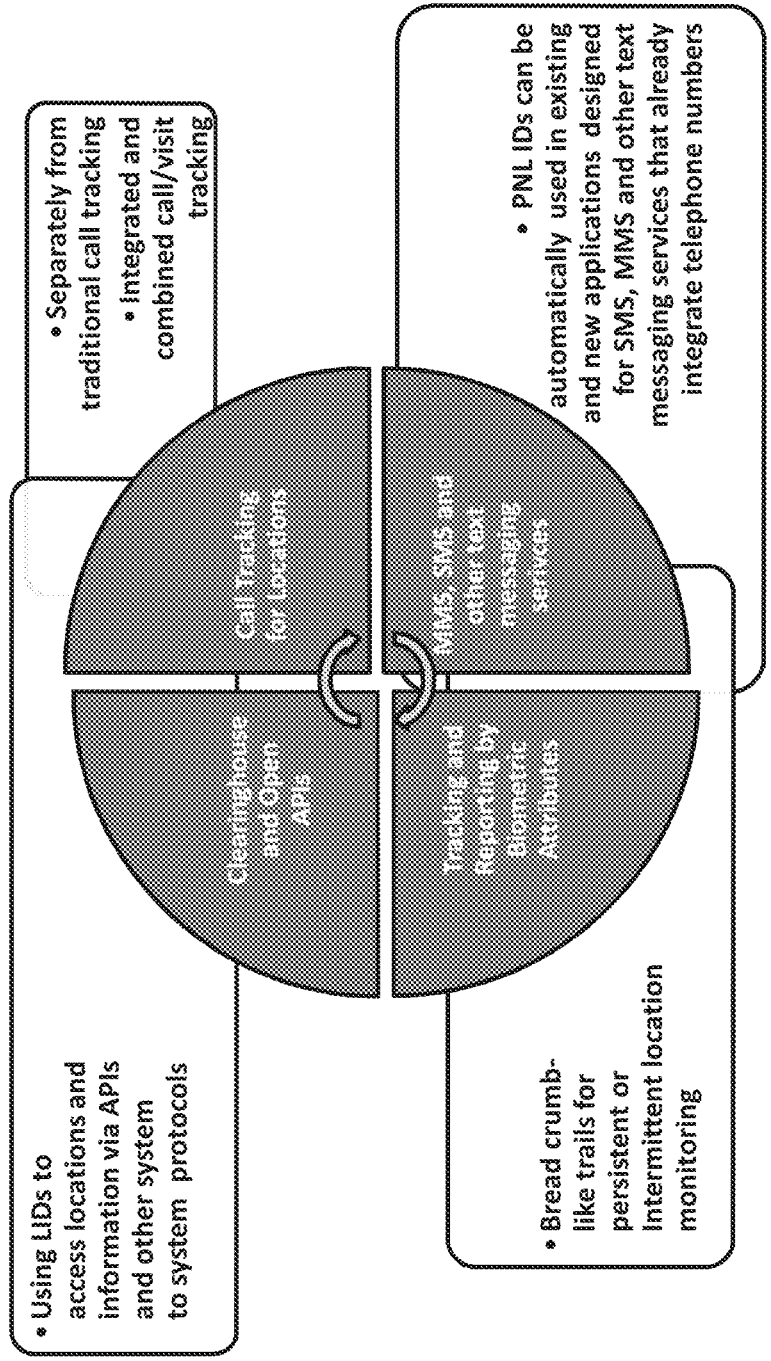
FIG. 26 shows exemplary additional services that may be included in the systems and methods herein.
Figure 27:
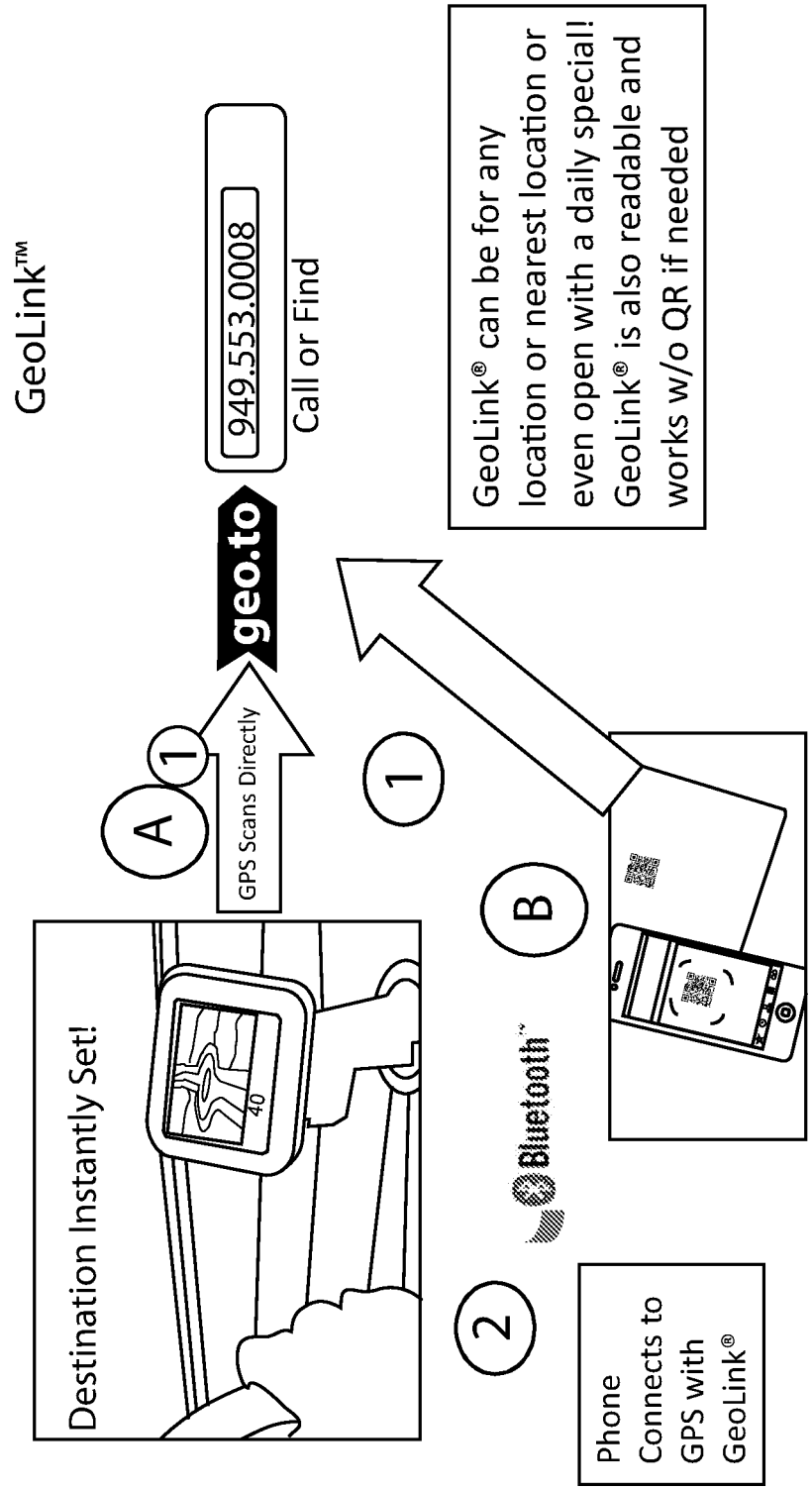
FIG. 27 shows exemplary images of alternative methods for scanning locational identifiers that may be included in the systems and methods herein.
Figure 29:
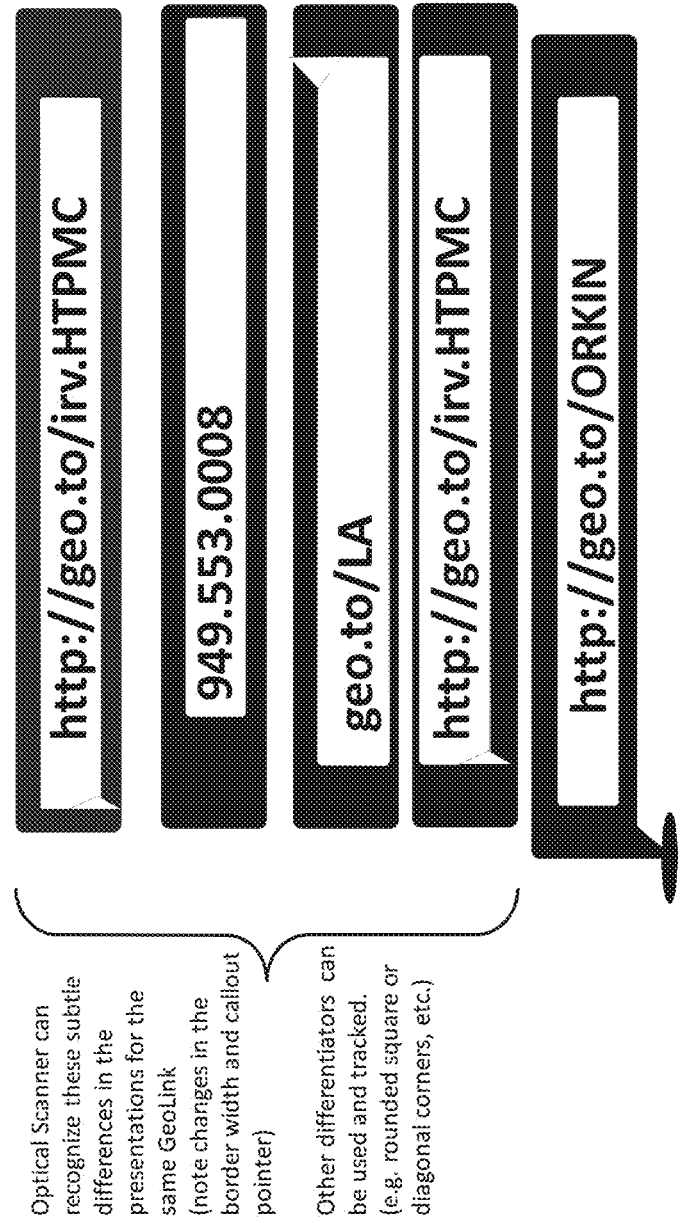
Figure 30:
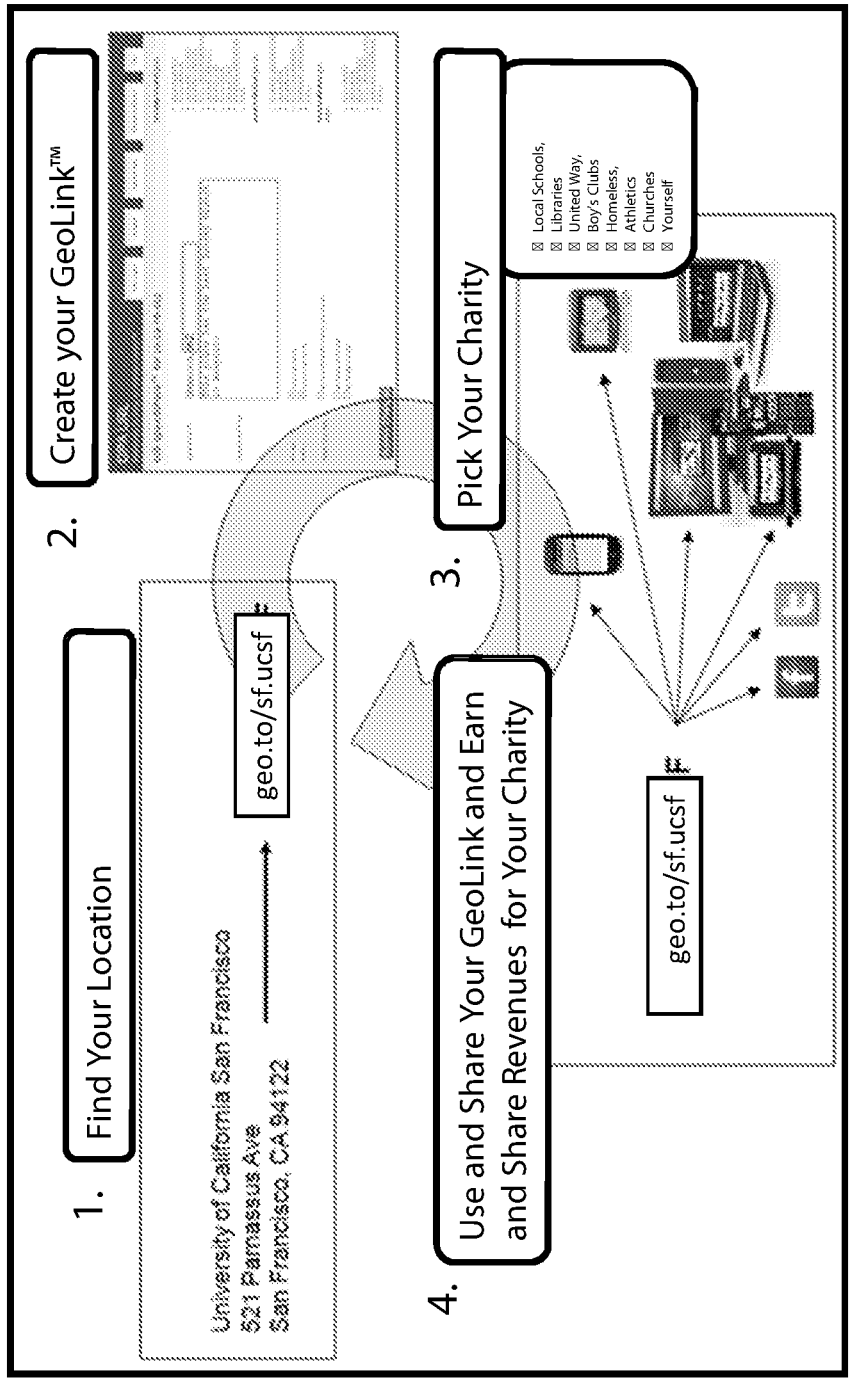
FIG. 30 shows exemplary images of various online website pages and exemplary services for owners and users to select and designate charities to receive micro-payments related to the use of location identifiers or IAE Services included in the systems and methods herein.

Set forth below are some examples of the ways that the Cross-Service Systems may enable IAE Services:

a) End Users may provide their personal mobile or other phone number, email addresses or other unique identifiers, including their unique personal or favorite LIDs (e.g., Home, Work, Parent's House, etc.) to the Cross-Service System, which may enable the IAE Service or Cross-Service System to instantly send a message including key information (for example, the LID or a hyperlink incorporating the LID for the location or locations to which the web site page relates) on behalf of the IAE Service or Customized Location Service directly to the End User without the necessity of the End User providing or entering his or her personal phone number on the IAE Service or the Customized Location Service, and the Cross-Service System may utilize the one or more numbers previously designated by the End User without querying the End User. Such numbers or other identifiers may be selectively used based on the Context or situation. For example, online messages or SMS messages may be sent during certain times, or for certain types of IAE Services, but other communications to the End User may be sent via email, while yet other types of messages may be deferred or delayed and/or sent via other modalities.

b) End Users may designate (and/or subsequently modify) their preferences for the types and/or providers of maps and/or other services typically provided by IAE Services or utilize preset locations of the End Users. For example, End Users may designate their preferred map provider as Google, Bing Maps, MapQuest, Open Street Maps or some other provider. End Users may also designate the type of maps and information they prefer (e.g., satellite, hybrid, street maps, street view, and the like).

c) End Users may compile, designate and manage their history of recent or favorite locations or related information and activities and/or the IAE Services may seamlessly enable the End Users to access such information for purposes of providing better and/or more customized IAE Services without expending additional time and effort disclosing additional information or otherwise interacting with the IAE Service, thereby enabling and enhancing both speed and privacy for the End User.

d) The IAE Services may be part of a loyalty, rewards, or other incentive programs provided over multiple Customized Location Services designed to encourage the utilization of the IAE Services and Customized Location Services associated therewith.

e) Aggregated reporting of usage of IAE Services may be provided, including aggregated or segmented, service by service, geo-analytics. Automatically recording and incorporating the locations of End Users accessing IAE Services across multiple Customized Location Services may be more easily and effectively handled by the Cross-Service Systems, as may be ensuring that all IAE Services of all types are updated, improved, and enhanced with data and other information and capabilities and services more quickly and efficiently and/or on a real-time basis. For example, the Cross-Service Systems may be able to aggregate data across multiple Customized Location Services ranging from the locations and the nature of the usage of individuals in order to obtain more information to more accurately report analyze and/or predict the activities of End Users. In the event of any predictive analytics, utilizing the Cross-Service Systems may increase the aggregate sample size or number of data points, thereby more likely to either enable statistically significant data sets and samples and/or increase the reliability of any such predictions and reducing the standard deviation error associated with such predictions and statistics because of the increased sample sizes. Such Cross-Service Systems could easily enable a reasonable prediction that would otherwise not be capable of determining.

f) Other examples of Cross-Service Systems include systems for End User to select or designate user preferences, save important information (work, home, school) to easily access information in close proximity to those locations, provide their mobile phone number or otherwise designate the specific mode and address of any communication forwarding information related to any LID directly to their phone or email, preferred methods of effecting payment to/from the End User to the Custom Location Service, any specific location or any other person or entity, linkages to social media communications and networks, private or public group communications or postings, archiving, saving or calendaring locations, dates or times, etc. FIGS. 24 and 25 show exemplary embodiments of sequences for the process and flow of providing and activating the IAE Services through a browser. Note that a significant advantage of the systems and methods described herein is that the Cross-Service Systems and Customized Location Services and information may be revised, enhanced and updated instantly for any IAE Service or all IAE Services, through changes to the Cross-Service Systems, without the necessity of any software programming or code changes by the operators of the Customized Location Services.

The following contains an example of the code that may be included in the software code of the Customized Location Services website to enable the IAE Services, which are then accessed and provided via separate web servers: script src="http://speedfind.com/js/geoto-tab.js" type="text/javascript"></script><script type="text/javascript">geoto_tab_parameters("http://geo.to/hi", 1, 5);</script>.

In this code, the underlined LID for Holiday Inn (HI) is included in an HTML hyperlink. However, that LID may also be included in any other new or existing recognizable protocol (e.g., geoto://HI or >>HI or geo.to:949.553.0008) to identify the LID and facilitate the recognition and use of the LID to provide the Cross Services in the above code. This designates both the LID for this particular Customized Location Service and automatically references the type of Cross Services Systems to be used to determine the location of the user/device (adjusted for the preferences or customization of the user by the Cross Services Systems) and to provide and display x number of locations and related information displayed and ranked by proximity to the location.

Note that the LID in this case may programmatically capture the domain name of the website (e.g. http://HolidayInn.com or http://geo.to/HolidayInn.com/hi.jwaca) or other non-locational ID visible on or included in the code of the underlying services to automatically determine the appropriate location(s) to be used and/or the nature of the content and services provided by the Cross Service Systems. Note also that the designated or automatically captured LID could also be a phone number, Twitter Name, email or other identifier, preferably included in the LID Registry.

Integration of LIDs into IAE Services

The use of LIDs enhances the ability to provide IAE Services across multiple services by simplifying the coding and designation of destinations and other information to be provided by the IAE Services, including the ability to associate an LID with the DNL ID, PNL ID, PL ID or other identifier from which the IAE Services are provided and to which they relate in order to automatically provide the appropriate location(s) and related information and services. Any specific LID(s) may be included in the code for any web page or other service, or the browser, extension, plug-in or other IAE Service enhanced application may automatically crawl the code and content for any such web page or other service, identify one or more LIDs, and utilize the LID to automatically provide the IAE Services.

The use of LIDs also may enable IAE Services to utilize any type of LID (e.g., PLN ID, PL ID, and the like), which may be more readily available or accessible to ensure that the appropriate IAE Services and information related to or associated with the LID is accessed and provided.

Enhanced Calling Access and Features Using LIDs

Figure 10:
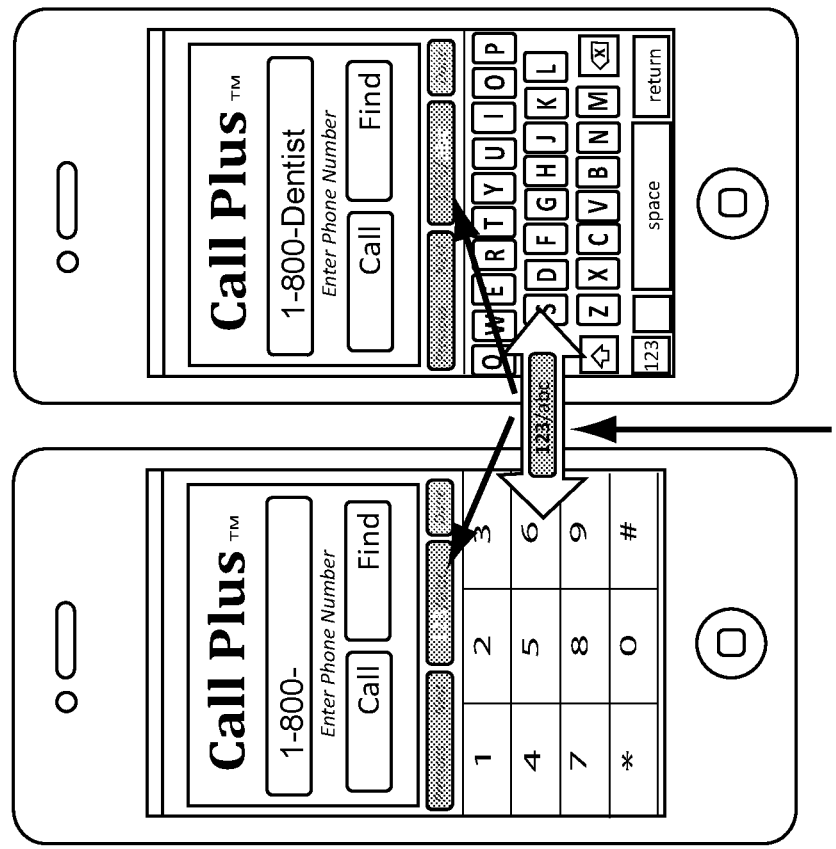
FIG. 10 shows an exemplary embodiment of an electronic device and associated method for inputting information, including PNL LIDs, with both numeric and alpha numeric keypads for PNL IDs that utilize vanity (alpha numeric) phone numbers.
Figure 11:
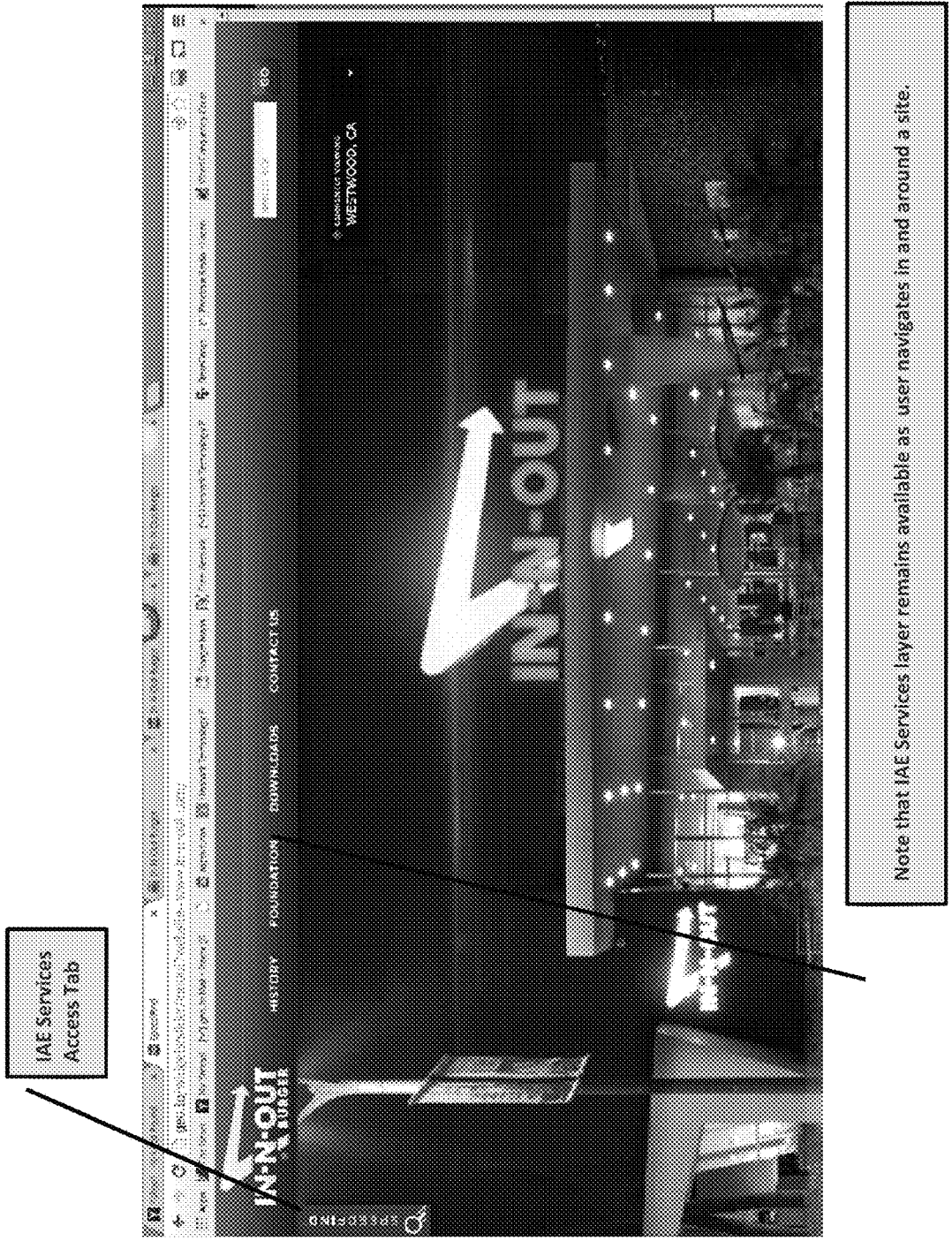
FIGS. 11-14 are exemplary images of an online website displayed on a computer screen showing various IAE Services access icons and layers of IAE Services related to a primary website. For example.
Figure 12:
Figure 13:
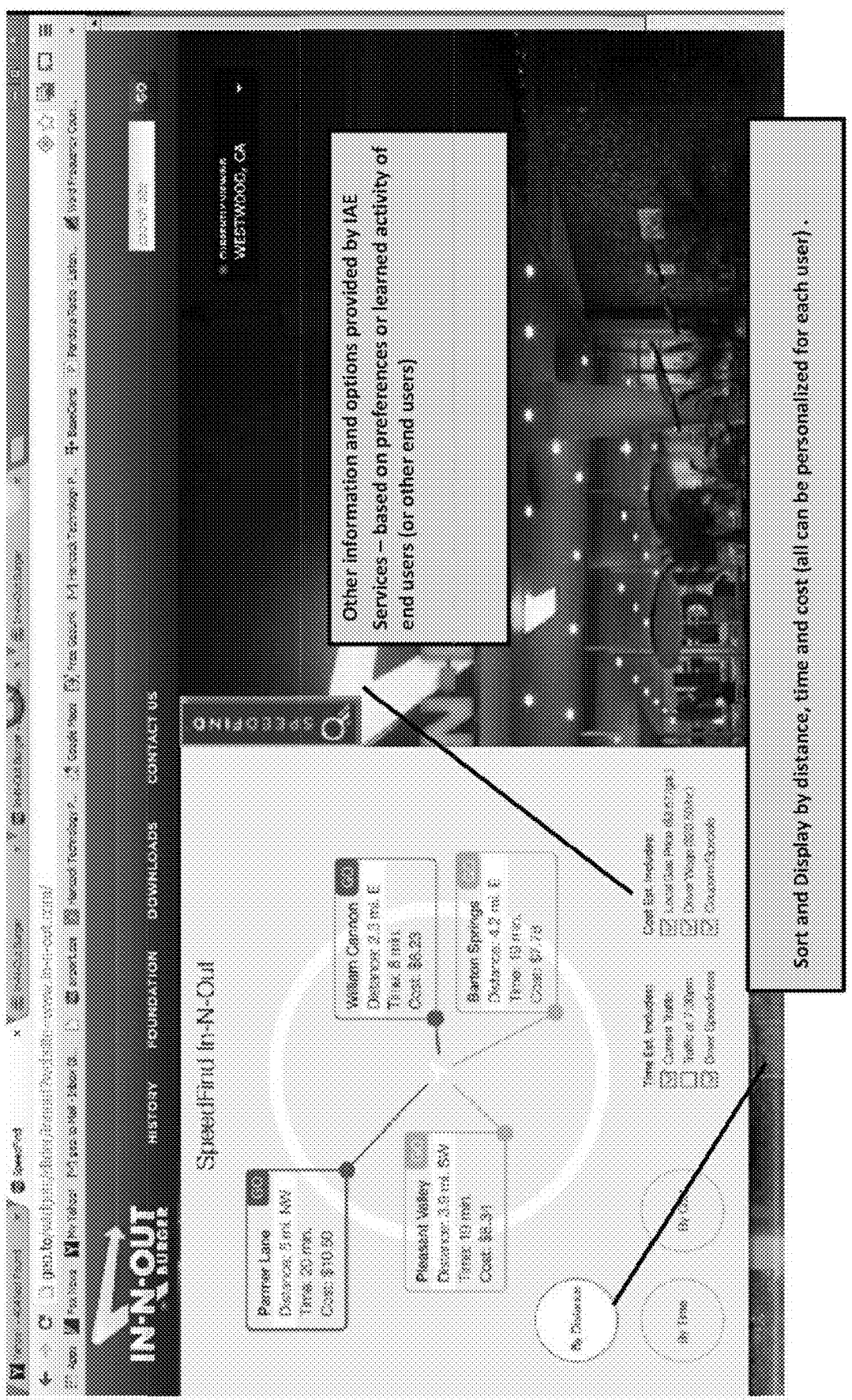
Figure 14:
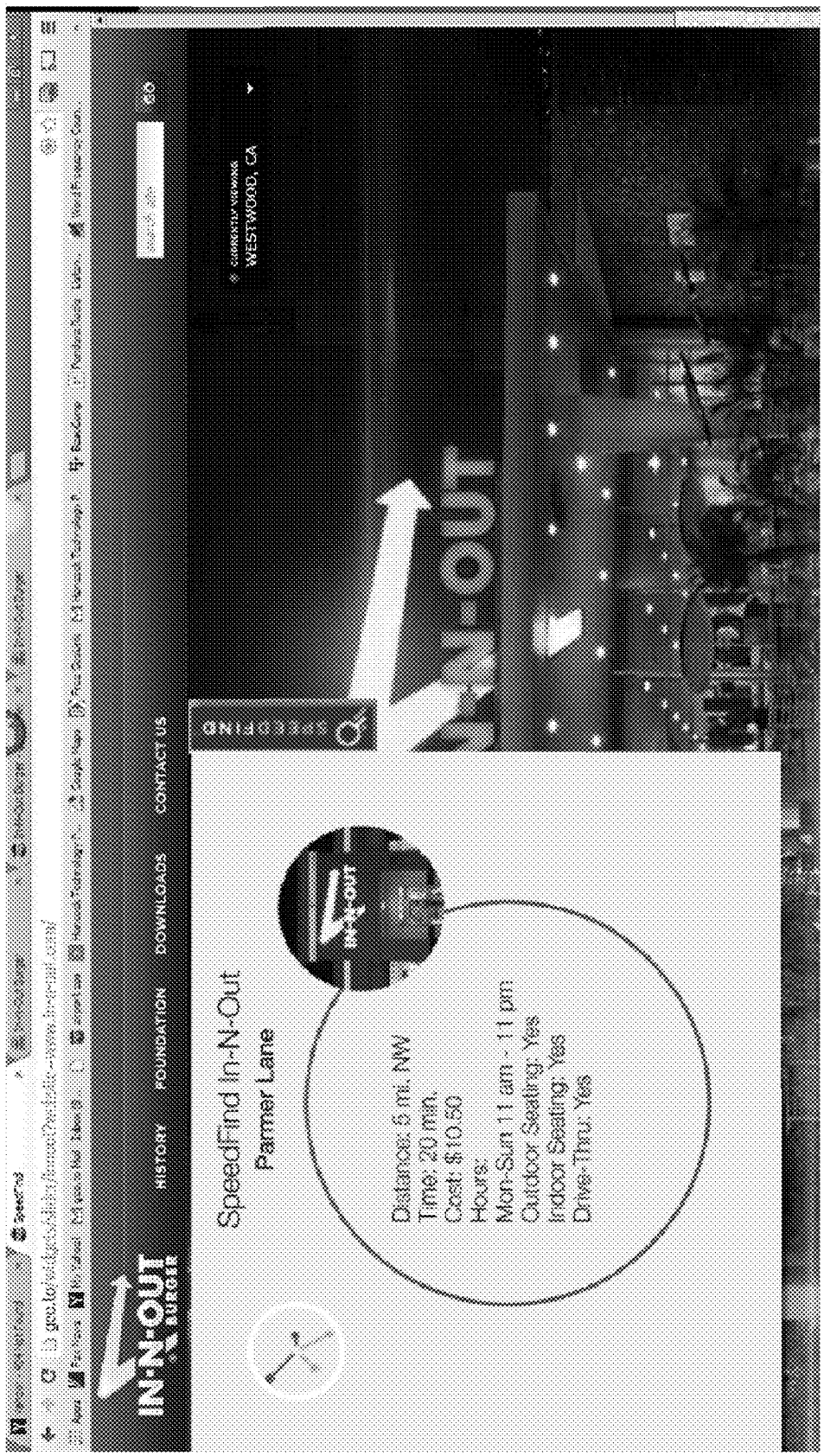
Figure 15:
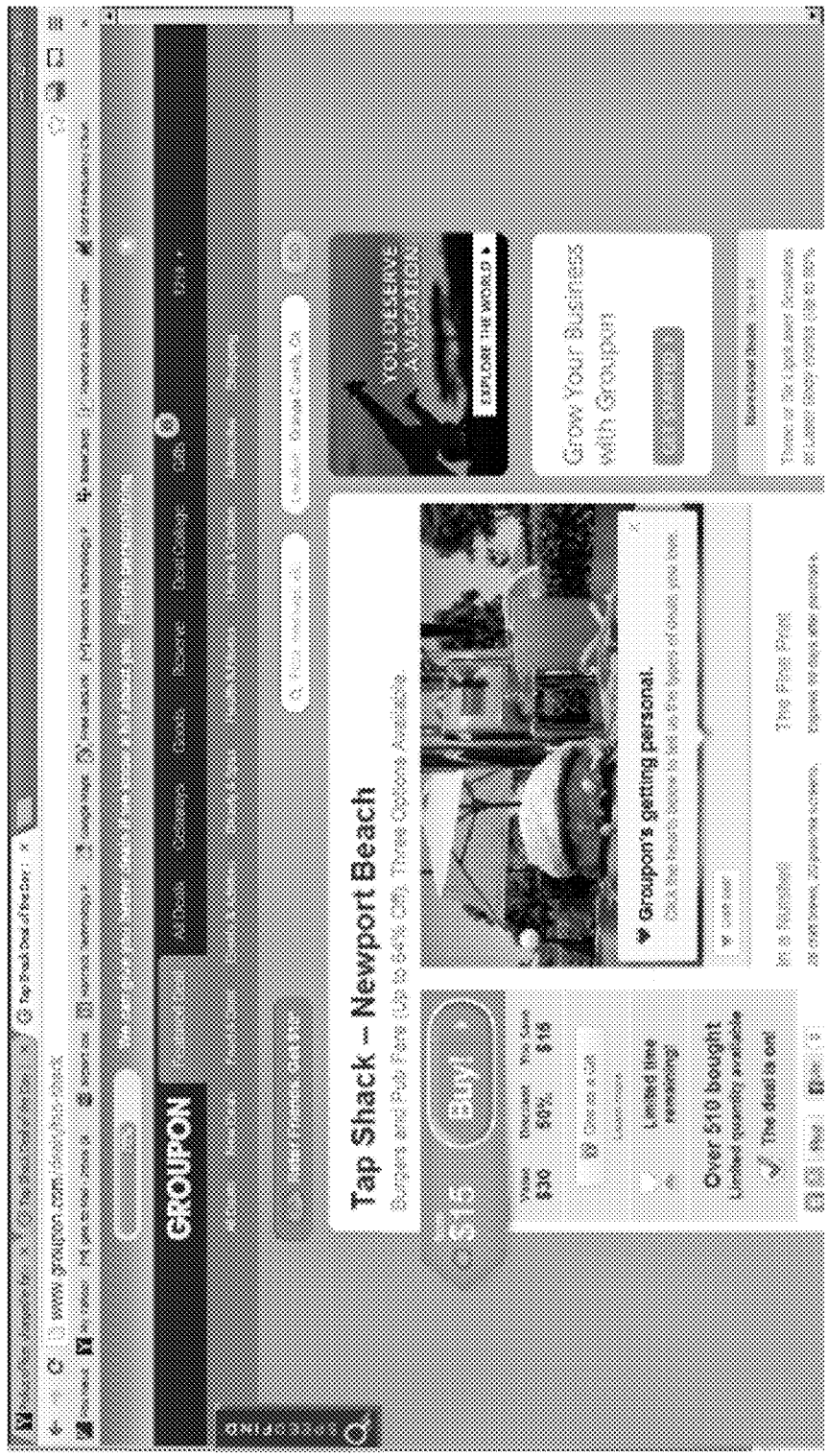
FIGS. 15-16 are exemplary images of an online website displayed on a computer screen showing an IAE Services access icon and layers of IAE Services controlled and displayed by the browser or operating system and directly related to specific LIDs and content and pages contained within a primary website.
Figure 16:
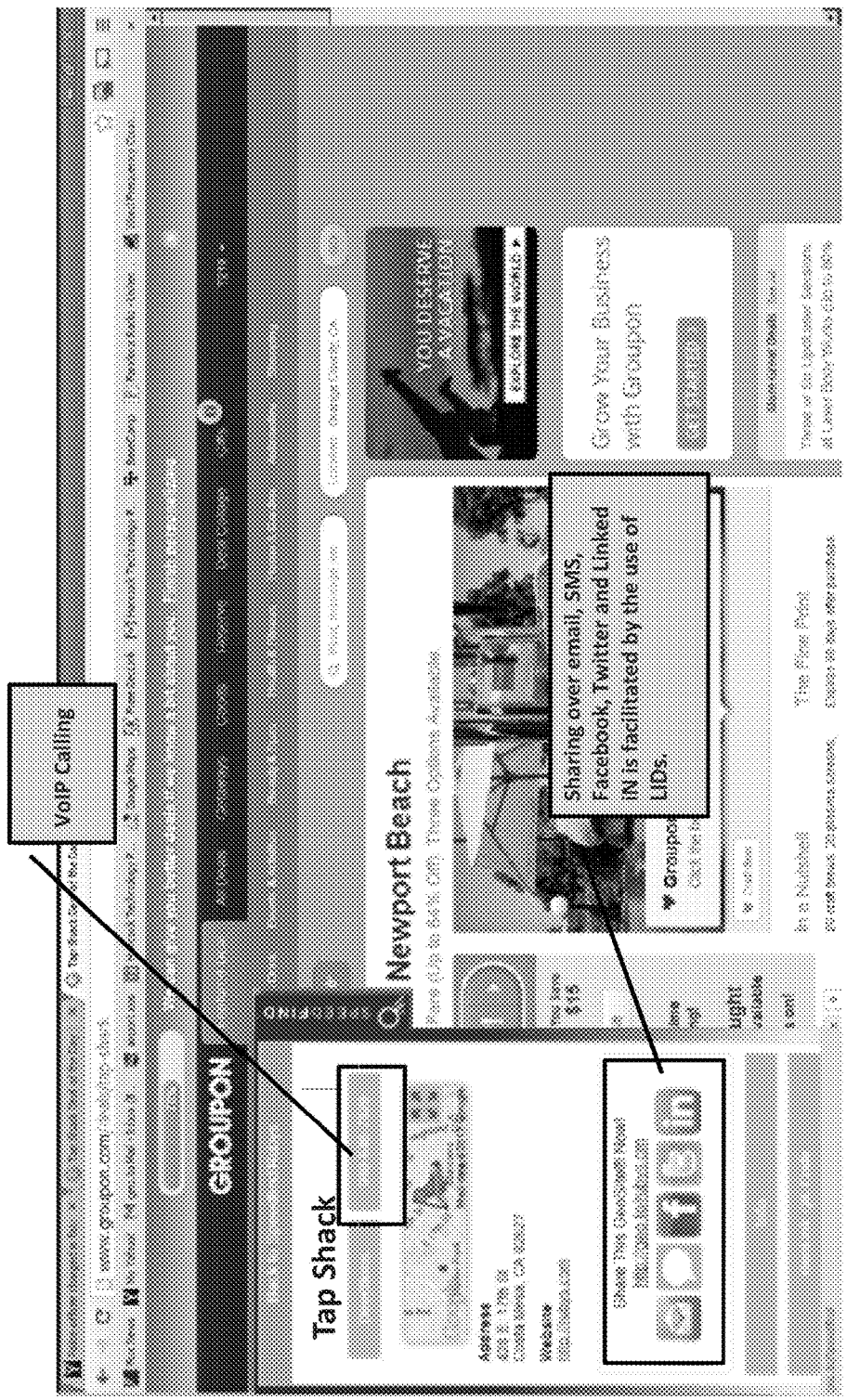
Figure 17:
FIGS. 17-19 are exemplary images of online websites displayed on a computer screen showing enhanced IAE Services including live, real-time maps, representations of locations, and other information based on the location of the End User and the relevant locations.
Figure 18:
Figure 19:
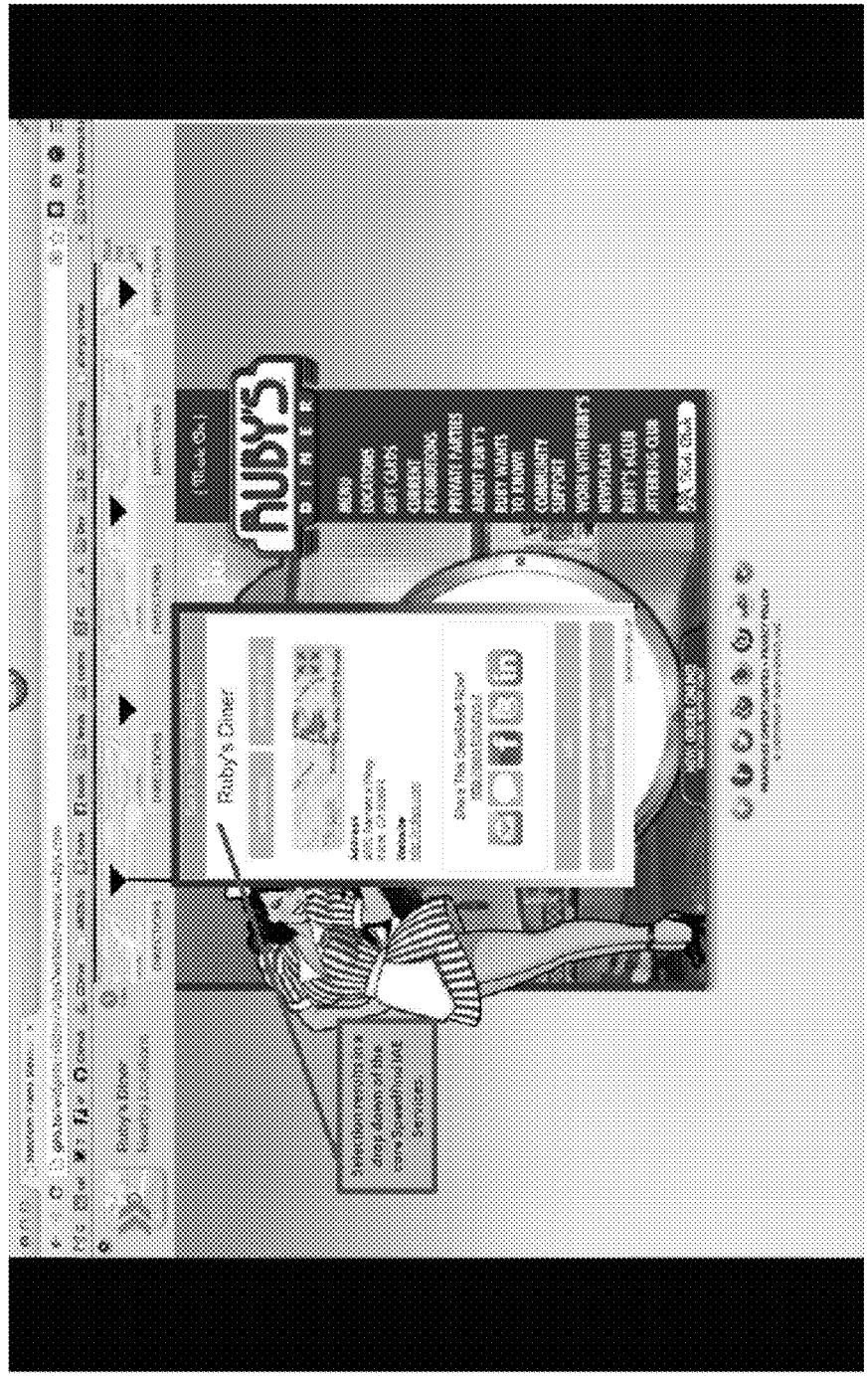
Figure 20:
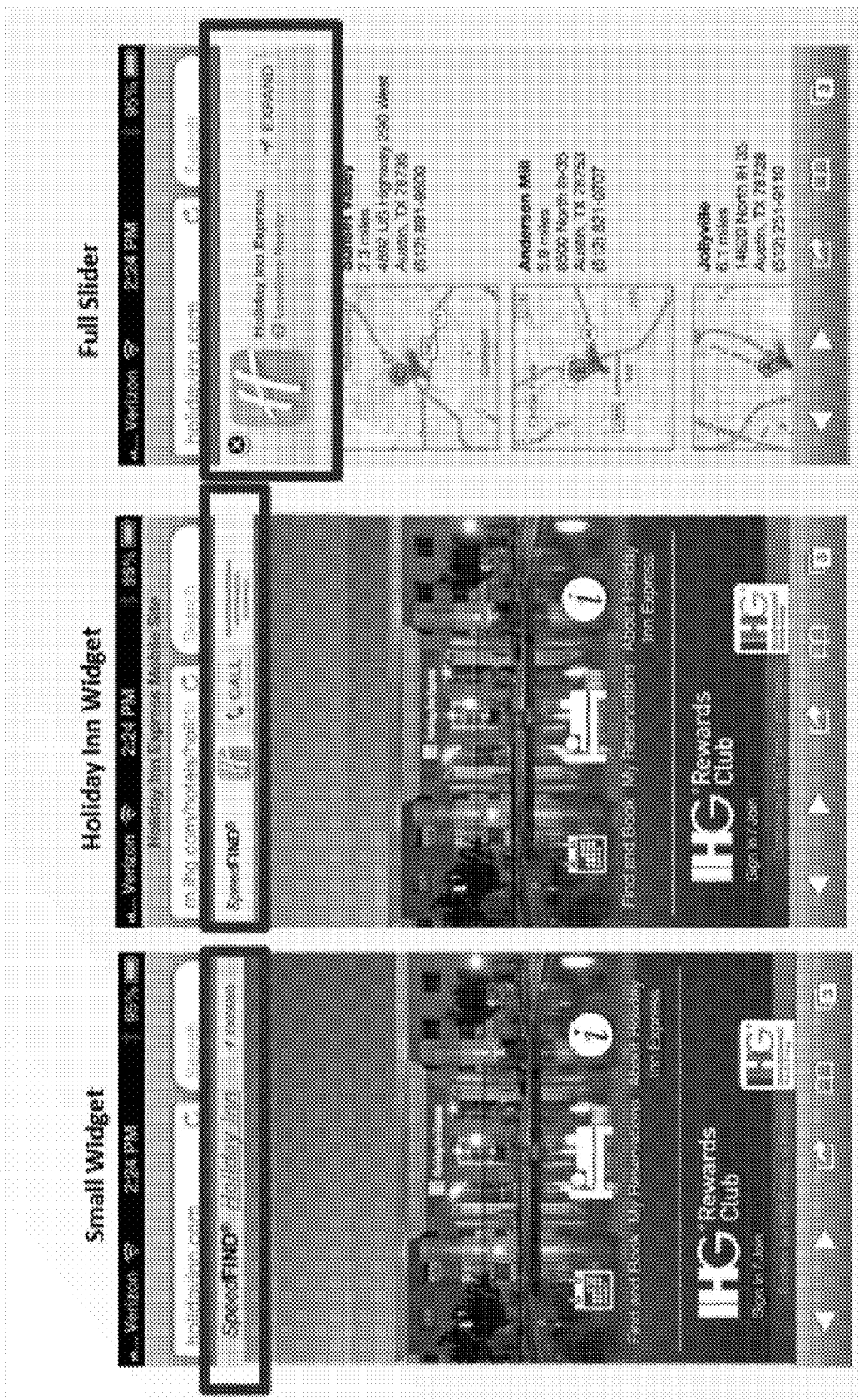
FIG. 20 shows exemplary images of mobile websites displayed in a mobile browser of an electronic device including IAE Services access bars controlled by the Internet browser or operating system of the device and an exemplary layer of IAE Services and information.
Figure 21:
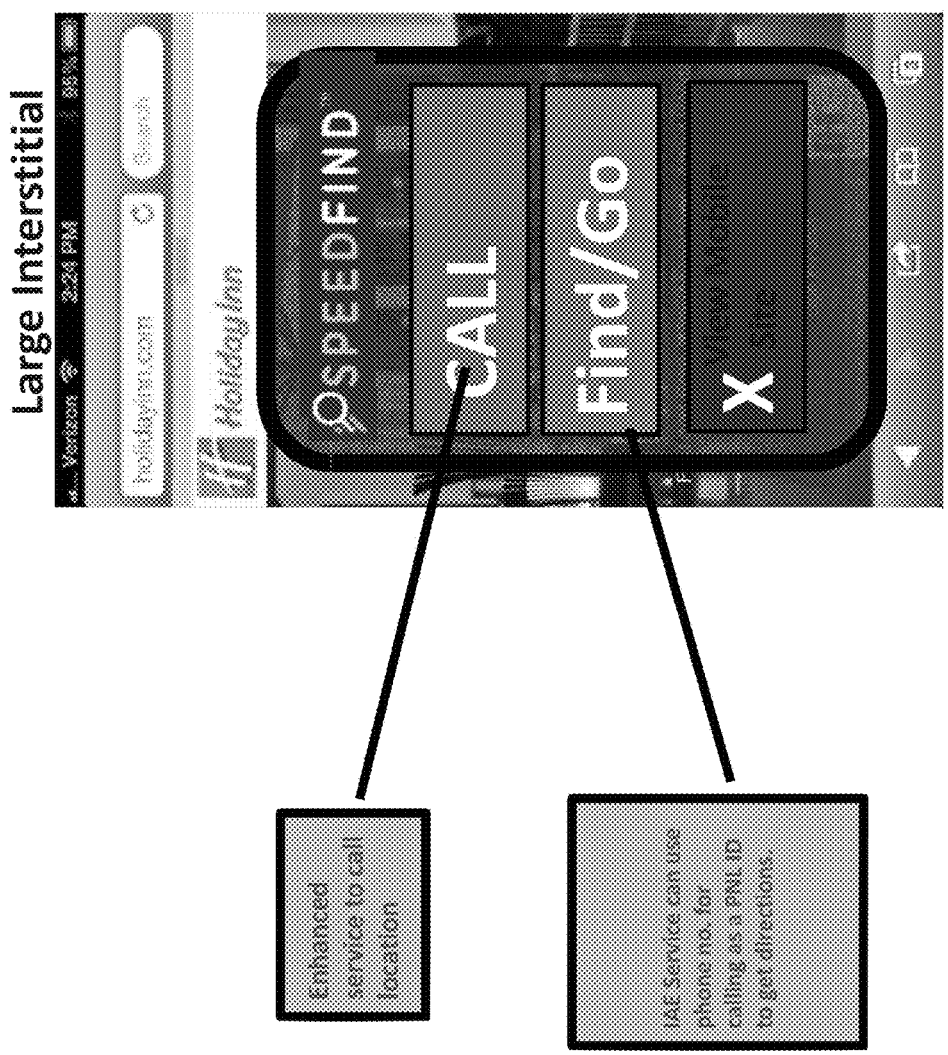
FIG. 21 shows an exemplary image of IAE Services provided as an interstitial presentation by a mobile browser or operating system of an electronic device.
Figure 22:
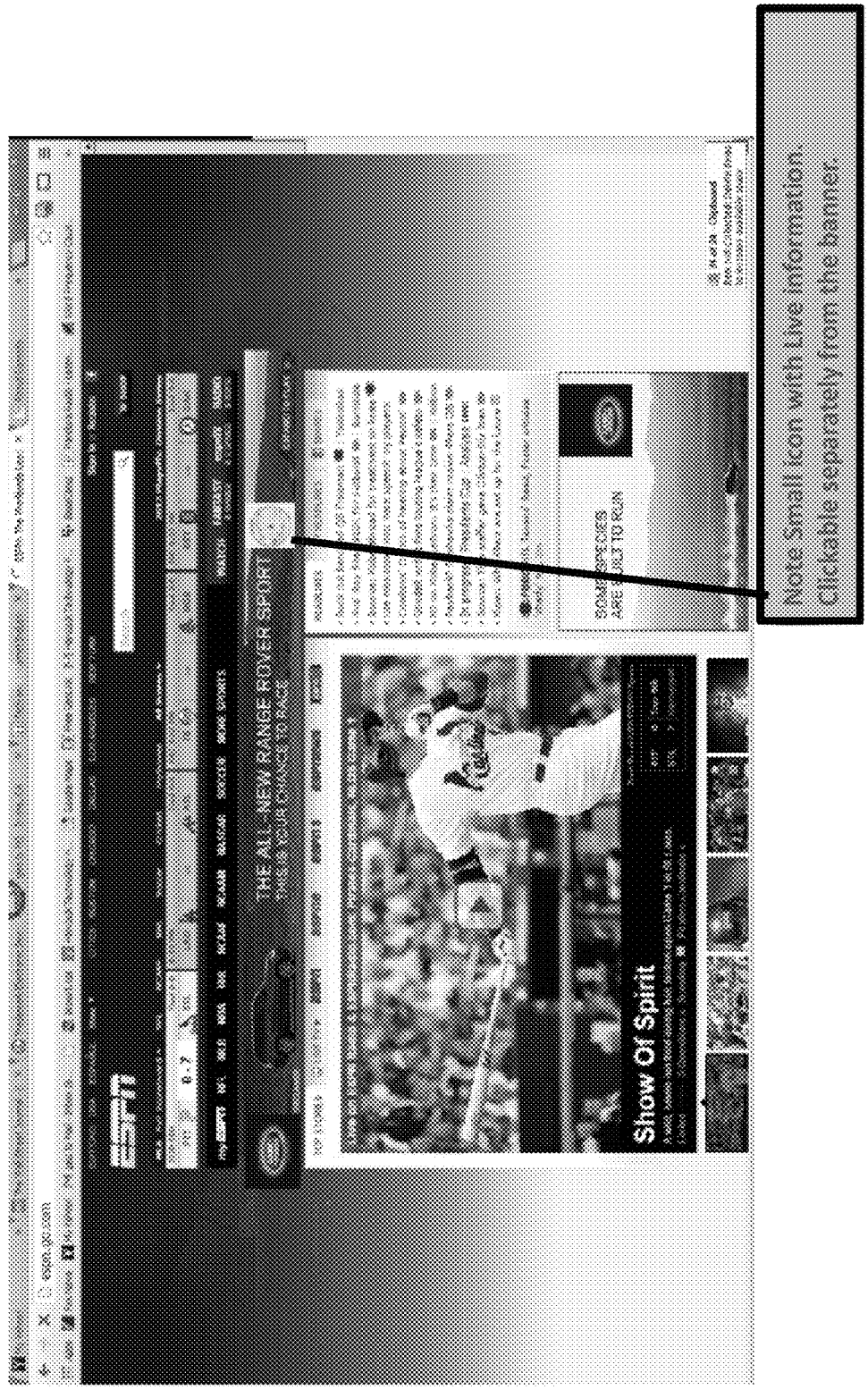
FIGS. 22-23 are exemplary images of online websites displayed on a computer screen showing enhanced IAE Services including live, real-time maps, representations of locations and other information based on the location of the End User and integrated with and included in display advertising, including live video displays.
Figure 23:
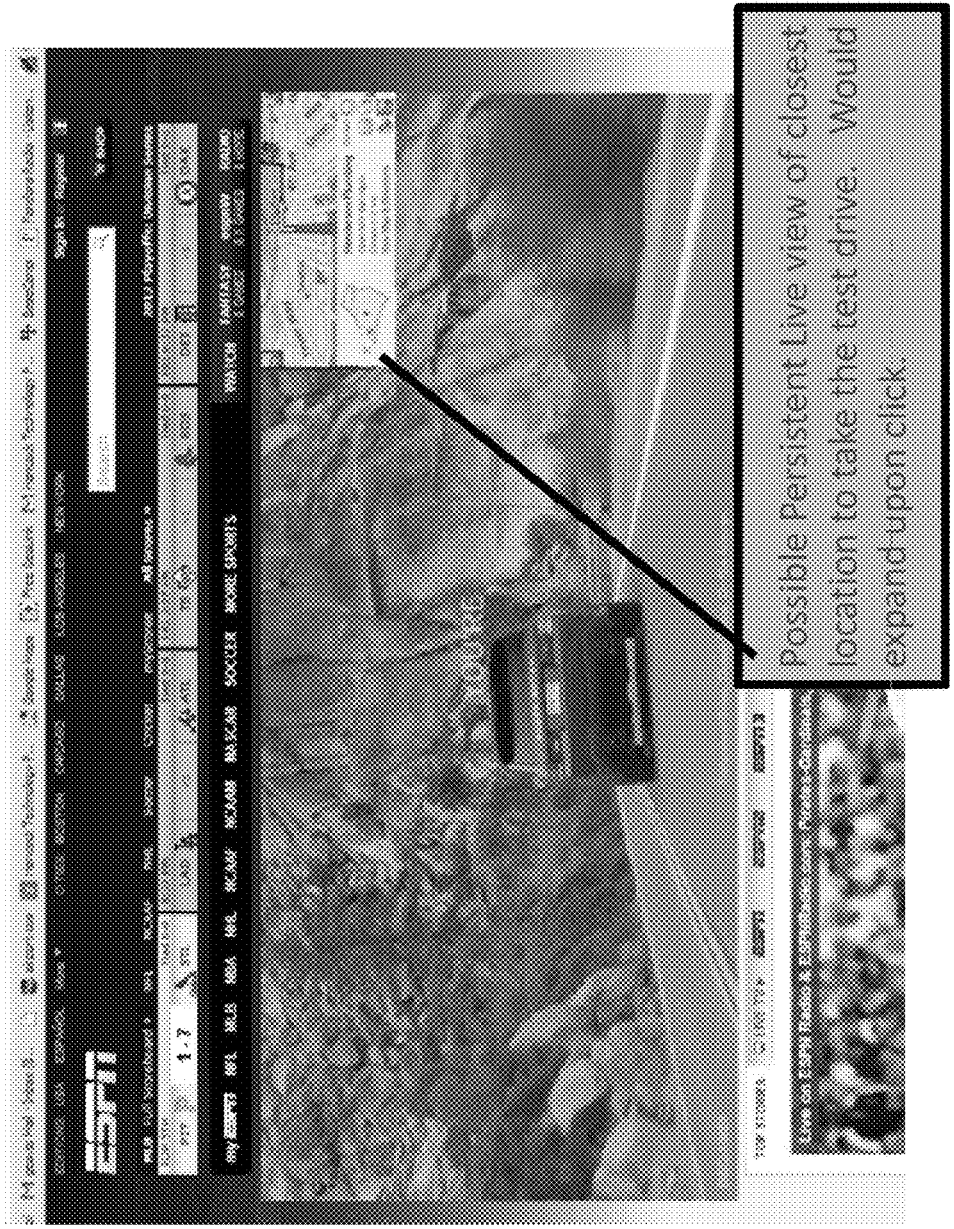

LIDs and IAE Services may also be used to provide faster, easier, and/or enhanced access to typical telephone services, such as phone calls and text messages, as well as locational services not typically provided directly by reference to phone numbers (PNL IDs) and other unique identifiers. Turning to FIG. 10, an exemplary mobile electronic device is shown, which may be used to perform an exemplary method for integrating LIDs and related information services directly into Devices and Services designed primarily for voice calling and/or mobile data access, which may include the following steps:

1) The user sees/hears advertisement or other communication that includes Vanity phone number (e.g., 1.800.dentist.);

2) The user inputs numeric characters into the keypad on the phone via the default numeric keypad;

3) The user toggles to the qwerty or other text entry keypad to enter characters 'd-e-n-t-i-s-t";

4) Once entered, the user has option to elect to Call, Text or Find the number or initiate the Speedfind sequence and services for that particular PNL-ID;

5) Note that the user may also enter any other non-locational identifier (e.g., Twitter Name (e.g., @800Dentist), domain name (e.g., 800dentist.com), email address (e.g., info@800dentist.com), geo.to Name (e.g. 800dentist), or other proprietary name) into any Device or Service in order to use the LID with the Device or Service, including IAE Services, as a new and more powerful address that effectively replaces traditional addresses or latitude longitude coordinates.

6) Note also that the user may enter numbers and text manually or may access any contact lists or other database used for other purposes; the services may also use voice input and auto completion features, and may also utilize location, time, user and other context enhancement capabilities to more quickly and effectively input the desired location;

7) The user may utilize the various Features before, during, or after a phone call, and the Owner of the phone number, Twitter name, domain name, etc. may control the features and location information made available to the end user/caller on a real-time basis, including determining whether and with what level of precision to share the current location of the Owner.

8) It is important to also note that with respect to PNL IDs, the entire legacy phone numbering plans and systems may be used to facilitate the use of local, regional, and international phone numbers (with or without country access codes and exit codes) to seamlessly integrate the use of PNL IDs as physical addresses. Accordingly, it may not be necessary for an individual to always type the country code, area code, and seven digit local PLN ID, but rather if the services will be able to discrete identify the seven digit local PNL ID in the same manner as the phone system can identify the local number for purposes of making a phone call or sending a text message.

The usage of LIDs and the LID Registry, with or without IAE Services, enables instant access to curated and verified location information and services that are manageable by the Owner of the underlying LID. Further, LIDs of all types may be used to facilitate or limit access, provide better and more timely (even real time) information, provide enhanced services, compile and report cross service visits, traffic and clicks, enable personalized services based upon various Contexts (e.g., user, device, location, date/time of day, and the like), and numerous other features.

Imbedding LIDs in Images, Files, Protocols and Commands

Any of the LIDs described herein may be imbedded into and incorporated and operational to work with any digital or electronic file structure or data or other transmission protocol, including image data and similar files, internet or other data transmission protocols, paths, functions, commands, and the like. Client and/or server side software programs, operating systems, and device interfaces may be used to automatically include such LIDs in such files or digital transmissions and/or to identify and resolve, interpret and parse any such LIDs included in any such files or digital transmission, thereby providing an interoperable platform and system of locational identifiers that may utilize the benefits of curated and interoperable LIDs and related systems and modules across virtually all devices and systems.

While the various systems and methods described herein are susceptible to various modifications, and alternative forms, specific examples of some have been shown in the drawings and described in detail. It should be understood, however, that such systems, methods and inventions are not to be limited to the particular forms or methods disclosed, but to the contrary, the invention is to cover all modifications, equivalents and alternatives falling within the scope of those described here.

We claim:

1. A method for registering, curating and providing access to location information with a locational identifier (LID) registry, the method comprising:
    receiving a request, from an electronic device of an owner via a network, to register a non-locational identifier owned by the owner and create a locational identifier for a physical location, the request including the non-locational identifier;
    verifying automatically by one of the LID registry or a third party registry that the owner owns the non-locational identifier; converting the non-locational identifier to a locational identifier within the LID registry;
    communicating with the LID registry to verify that the locational identifier is unique and available within the LID registry;
    registering the locational identifier to the owner and associating the locational identifier with at least one locational address within the LID registry; and
    enabling the owner to control access by end users to location information associated with the locational identifier included in the LID registry to facilitate navigation to or from or locating the physical location associated with the locational identifier,
    wherein enabling the owner to control access comprises:
    communicating to the owner a plurality of options for limiting access by end users to the location information; and
    receiving a communication from the owner including selected options from the plurality of options,
    the plurality of options comprising:
    a) limiting end users access to the location information based at least in part on locational proximity of the end users to the physical location;
    b) limiting end users access to the location information based at least in part on date and time;
    c) limiting end users access to the location information based at least in part on connectivity of the end users to a third party identified by the owner; and
    (d) limiting end users access to the location information based at least in part on context of the request or the end user making the request.

2. The method of claim 1, wherein the non-locational identifier is converted into a locational identifier that includes components of the non-location identifier.

3. The method of claim 1, wherein the locational identifier is identical to the non-locational identifier.

4. The method of claim 1, wherein converting the non-locational identifier into a locational address comprises appending an additional unique alpha-numeric sequence to the non-locational identifier.

5. The method of claim 1, wherein the locational address is identified by reference to one of a two dimensional xy coordinate system, a three-dimensional xyz coordinate system, or hierarchical coordinates derived directly from or directly related to the physical location identified by the locational address.

6. The method of claim 1, wherein the physical location is a static geographic location or a movable location.

7. The method of claim 1, wherein registering the locational identifier to the owner and associating the non-locational identifier with the locational identifier within the LID registry comprises registering sub-locational identifiers for one or more physical sub-locations appended to the non-locational identifier to identify the one or more physical sub-locations.

8. The method of claim 7, wherein one of the physical location, one or more physical sub-locations, and related information include one or more locational addresses defined by one of a two-dimensional xy coordinate system, a three-dimensional xyz coordinate system, or hierarchical coordinates derived directly from or directly related to the physical location or one or more physical sub-locations.

9. The method of claim 1, wherein the LID registry is combined with tracking, reporting, and accounting systems that account for one of either micro-payment charges assessed by owners to users for the usage of, or micro-payment fees paid by owners to users for the usage of, one or more locational identifiers or information related to one or more locational addresses associated with respective locational identifiers.

10. The method of claim 9, wherein the one or more micro-payment charges are based at least in part on locational addresses related to one or more locational identifiers determined by micro-location references to at least one of a two-dimensional xy coordinate system, a three-dimensional xyz coordinate system, or hierarchical coordinate system derived directly from or directly related to physical locations associated with respective locational addresses or information related to such location addresses.

11. The method of claim 10, wherein the information related to one or more locational addresses is navigation based upon or determined by the two-dimensional xy, three dimensional xyz, or hierarchical coordinates to physical micro-locations to, in and around buildings, floors, and rooms identified by or directly related to respective locational addresses.

12. The method of claim 9, wherein the information related to one or more location addresses is navigation based upon or determined by the two-dimensional xy, three-dimensional xyz, or hierarchical coordinates to physical micro-locations to, in and around buildings, floors, and rooms identified by or directly related to respective locational addresses.

13. The method of claim 1, wherein the locational identifier or the information obtained by using the locational identifier is used for 911 or other emergency services.

14. A method for registering, curating and providing access to location information with a locational identifier (LID) registry, the method comprising:
receiving a request, from an electronic device of an owner via a network, to register a non-locational identifier owned by the owner and create a locational identifier for one or more physical locations, the request including the non-locational identifier;
verifying automatically by the LID registry or a third party registry that the owner owns the non-locational identifier;
converting the non-locational identifier to a locational identifier within the LID registry;
communicating with the LID registry to verify that the locational identifier is unique and available within the LID registry;
registering the locational identifier to the owner and associating the locational identifier with at least one locational address within the LID registry;
enabling the owner to control access by end users to location information associated with the locational identifier included in the LID registry to facilitate navigation to or from or locating the physical location associated with the locational identifier;
receiving a user request, from a user electronic device via the network, the request including the non-locational identifier;
accessing the LID registry to confirm that the non-locational identifier is still owned by the owner and the non-locational identifier is associated with a locational address within the LID Registry;
verifying by the LID registry that the owner of the locational identifier within the registry has authorized the user of the electronic device to access information associated with the locational identifier; and
sending a response to the user electronic device via the network, the response including authorized information regarding the physical location from the LID registry to facilitate navigation relative to the physical location,
wherein verifying that the owner has authorized access comprises:
confirming by the LID registry that the non-locational identifier is still owned by the owner;
sending an authorization request by the LID registry to the owner after receiving the user request; and
receiving a confirmation response from the owner authorizing providing location information to the user electronic device, before sending the response to the user electronic device.

15. The method of claim 14, wherein the information includes at least one of a map including the physical location, navigation services related to the physical location, and routing and directions to the physical location.

16. The method of claim 14, wherein the authorization request includes identity information identifying the user to the owner.

17. The method of claim 14, wherein the physical location is a movable location, and wherein sending a response to the user electronic device comprises:
obtaining a current geographic location of the physical location; and
including the current geographic location in the response to the user electronic device.

18. The method of claim 14, wherein receiving a user request comprises the user scanning the locational identifier.

19. The method of claim 18, wherein the scanning is of a visually identifiable locational identifier such as a printed phone number, email address, social media handle or other locational identifier.

20. A method for registering, curating and providing access to location information with a locational identifier (LID) registry, the method comprising:
receiving a request, from an electronic device of an owner via a network, to register a non-locational identifier owned by the owner and create a locational identifier for one or more physical locations, the request including the non-locational identifier;
verifying automatically by the LID registry or a third party registry that the owner owns the non-locational identifier;
converting the non-locational identifier to a locational identifier within the LID registry;
communicating with the LID registry to verify that the locational identifier is unique and available within the LID registry;
registering the locational identifier to the owner and associating the locational identifier with at least one locational address within the LID registry;
enabling the owner to control access by end users to location information associated with the locational identifier included in the LID registry to facilitate navigation to or from or locating the physical location associated with the locational identifier;

receiving a user request, from a user electronic device via the network, the request including the non-locational identifier;

accessing the LID registry to confirm that the non-locational identifier is still owned by the owner and the non-locational identifier is associated with a locational address within the LID Registry;

verifying by the LID registry that the owner of the locational identifier within the registry has authorized the user of the electronic device to access information associated with the locational identifier; and sending a response to the user electronic device via the network, the response including authorized information regarding the physical location from the LID registry to facilitate navigation relative to the physical location, wherein receiving a user request entry by a user or query of a locational identifier in the database comprises the user scanning the locational identifier, wherein the scanning is of a visually identifiable locational identifier such as a printed phone number, email address, social media handle or other locational identifier, and wherein the visually identifiable identifier includes a subliminal optical differentiator.

21. A method for registering, curating and providing access to location information with a locational identifier (LID) registry, the method comprising:

receiving a request, from an electronic device of an owner via a network, to register a non-locational identifier owned by the owner and create a locational identifier for one or more physical locations, the request including the non-locational identifier;

verifying automatically by the LID registry or a third party registry that the owner owns the non-locational identifier;

converting the non-locational identifier to a locational identifier within the LID registry;

communicating with the LID registry to verify that the locational identifier is unique and available within the LID registry;

registering the locational identifier to the owner and associating the locational identifier with at least one locational address within the LID registry;

enabling the owner to control access by end users to location information associated with the locational identifier included in the LID registry to facilitate navigation to or from or locating the physical location associated with the locational identifier;

receiving a user request, from a user electronic device via the network, the request including the non-locational identifier;

accessing the LID registry to confirm that the non-locational identifier is still owned by the owner and the non-locational identifier is associated with a locational address within the LID Registry;

verifying by the LID registry that the owner of the locational identifier within the registry has authorized the user of the electronic device to access information associated with the locational identifier; and sending a response to the user electronic device via the network, the response including authorized information regarding the physical location from the LID registry to facilitate navigation relative to the physical location, wherein receiving a user request entry by a user or query of a locational identifier in the database comprises the user scanning the locational identifier, and wherein scanning the locational identifier comprises scanning a biometric attribute initiated by either the owner of the biometric attribute or a third party unrelated to the owner of the biometric attribute.

22. A system for registering, curating and providing access to location information, comprising:

a database including a locational identifier (LID registry); and a server communicating with the database via a network, the server configured to:

receive a request, from an electronic device of an owner via a network, to register a non-locational identifier owned by the owner and create a locational identifier for a physical location, the request including the non-locational identifier;

verify automatically by one of the LID registry or a third party registry that the owner owns the non-locational identifier; converting the non-locational identifier to a locational identifier within the LID registry;

communicate with the LID registry to verify that the locational identifier is unique and available within the LID registry;

register the locational identifier to the owner and associating the locational identifier with at least one locational address within the LID registry; and enable the owner to control access by end users to location information associated with the locational identifier included in the LID registry to facilitate navigation to or from or locating the physical location associated with the locational identifier, wherein the server is configured to enable the owner to control access by:

communicating to the owner a plurality of options for limiting access by end users to the location information; and receiving a communication from the owner including selected options from the plurality of options, the plurality of options comprising:

a) limiting end users access to the location information based at least in part on locational proximity of the end users to the physical location;

b) limiting end users access to the location information based at least in part on date and time;

c) limiting end users access to the location information based at least in part on connectivity of the end users to a third party identified by the owner; and (d) limiting end users access to the location information based at least in part on context of the request or the end user making the request.

* * * * *